United States Patent [19]
Kobayashi et al.

[11] Patent Number: 4,581,654
[45] Date of Patent: Apr. 8, 1986

[54] PORTABLE TELEVISION RECEIVER OF THE PANEL TYPE

[75] Inventors: Saburo Kobayashi; Nobol Yabe; Shunji Kashiyama; Masao Kawamura; Takahiro Fuse; Yukinori Hirasawa, all of Tokyo, Japan

[73] Assignee: Casio Computer Co., Ltd., Tokyo, Japan

[21] Appl. No.: 517,370

[22] Filed: Jul. 26, 1983

[30] Foreign Application Priority Data

Aug. 4, 1982 [JP] Japan ................... 57-136028

[51] Int. Cl.$^4$ .................... H04N 3/14; H04N 5/66
[52] U.S. Cl. .................... 358/230; 358/241; 358/59
[58] Field of Search ............. 358/230, 236, 241, 254, 358/280, 140, 160, 56, 59

[56] References Cited

U.S. PATENT DOCUMENTS

| | | | |
|---|---|---|---|
| 3,562,414 | 2/1971 | Blum | 358/230 |
| 3,622,226 | 11/1971 | Matthies | 358/236 |
| 4,194,215 | 3/1980 | Shionoya | 358/230 |

FOREIGN PATENT DOCUMENTS 92086 7/1980 Japan ................... 358/236

OTHER PUBLICATIONS

A Pocketable Liquid—Crystal Television Receiver, by N. Kokado, et al., IEEE Transactions on Consumer Electronics, vol. CE—27, No. 3, Aug. 1981, pp. 462–469.

Pocket—Sized Liquid Crystal TV Receiver, by M. Yoshiyama, et al., National Technical Report, vol. 25, No. 3 (Jun. 1979), pp. 500–508.

Primary Examiner—Tommy P. Chin
Attorney, Agent, or Firm—Pennie & Edmonds

[57] ABSTRACT

A portable television reciever of the panel type, having a pocketable size, is provided with about ⅛ the number of scanning electrodes as effective T.V. picture scanning lines, and a panel type picture display device with a double matrix array in which two picture element electrodes lying on each of the signal electrodes commonly provided in the direction of the width of said scanning electrodes are disposed in opposition to each other. A display circuit is driven at a duty cycle expressed as follows:

$$1 \Big/ \left( \frac{C}{A \cdot B} \right)$$

where A is the number of fields constituting one frame, B is the number of horizontal periods for a video signal assigned to a scanning electrode; and C is the number of scanning lines.

3 Claims, 41 Drawing Figures

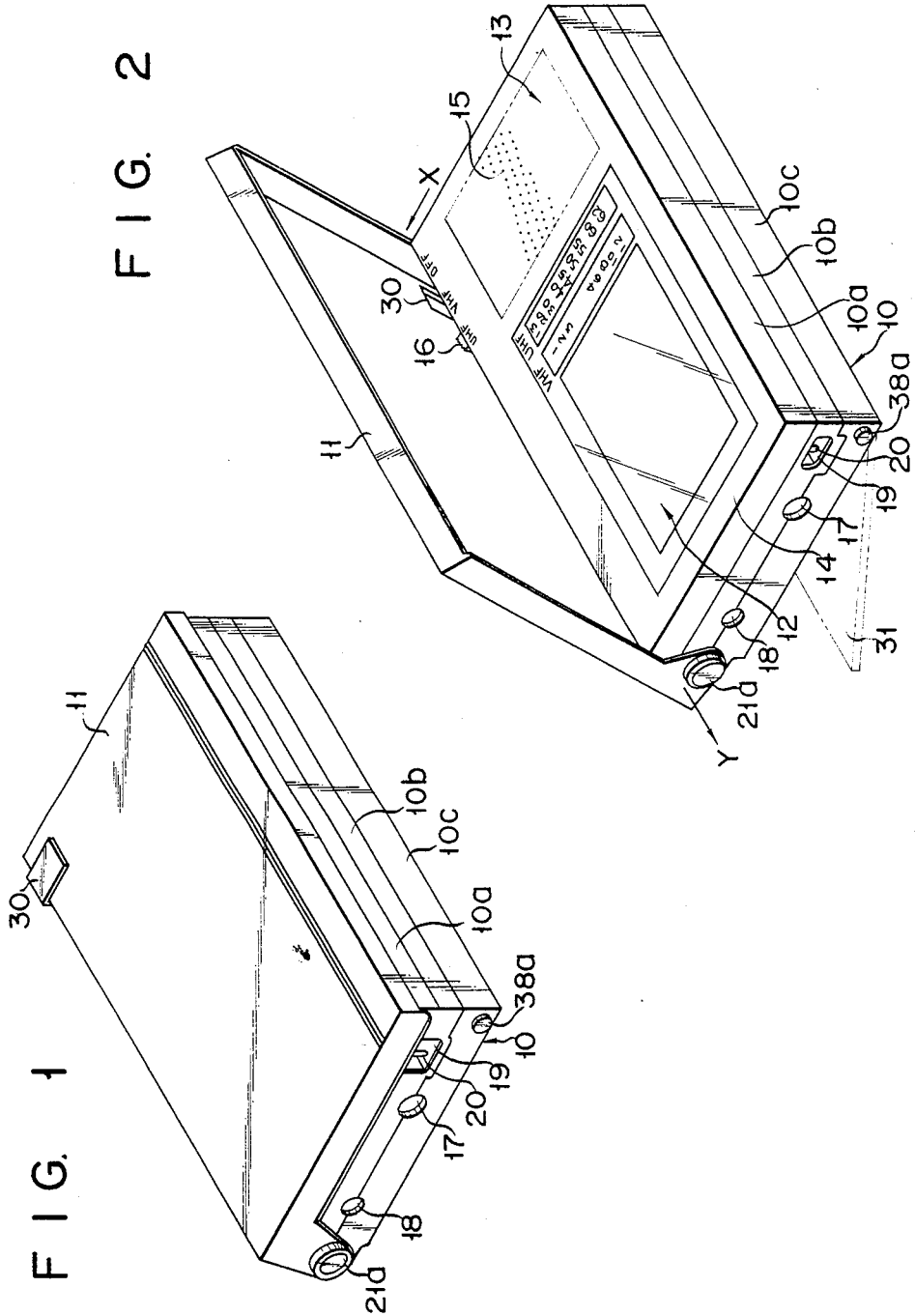

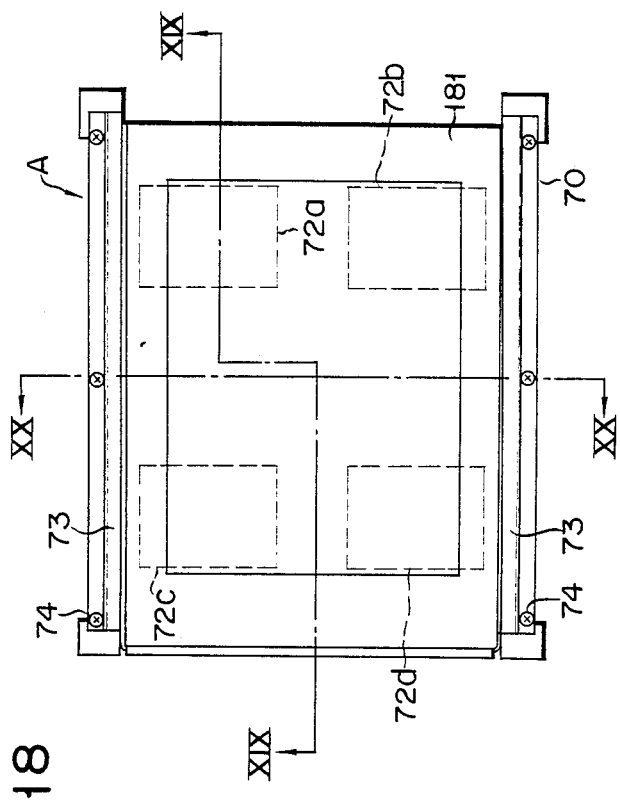
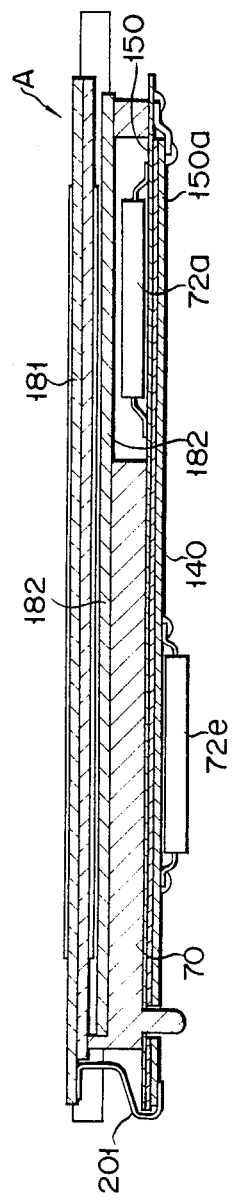
FIG. 18
FIG. 19

F I G. 21
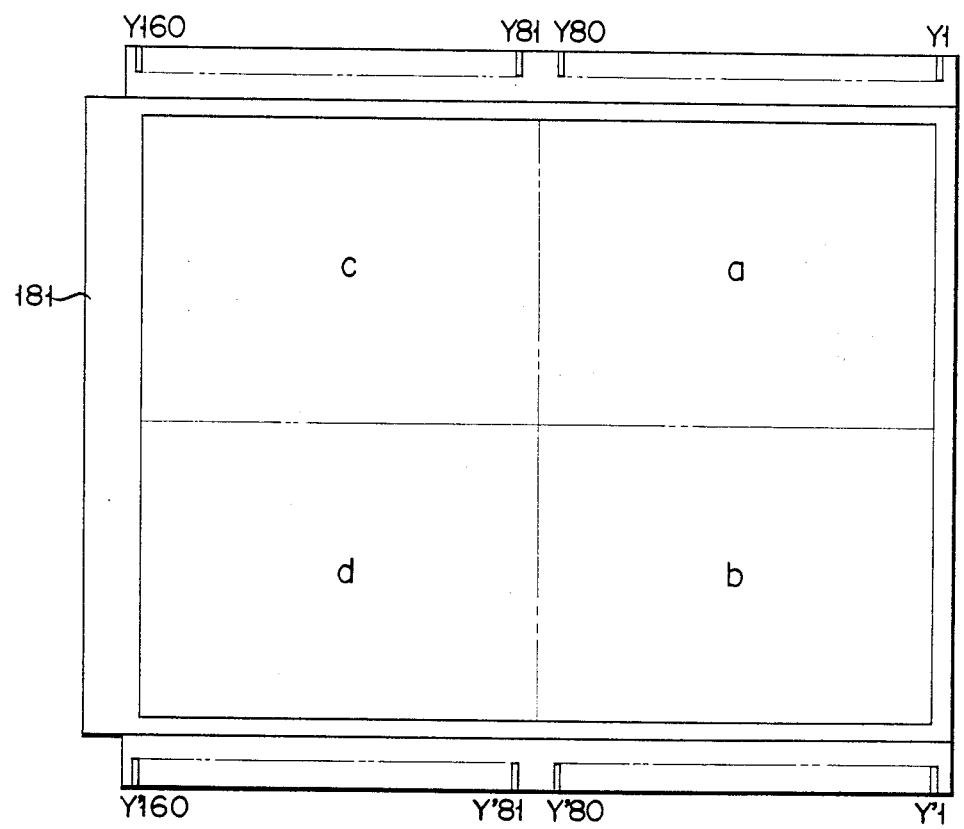

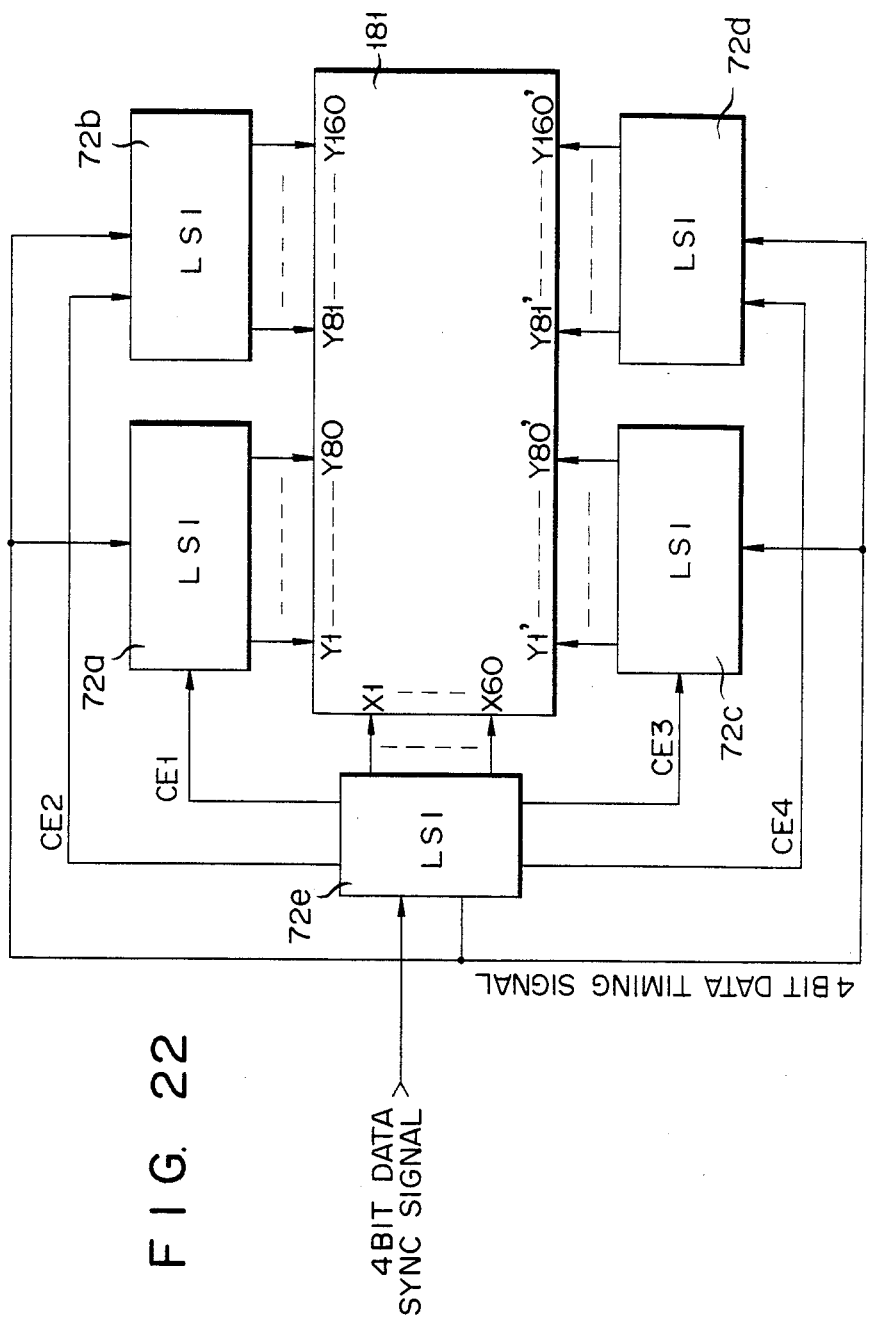
F I G. 22

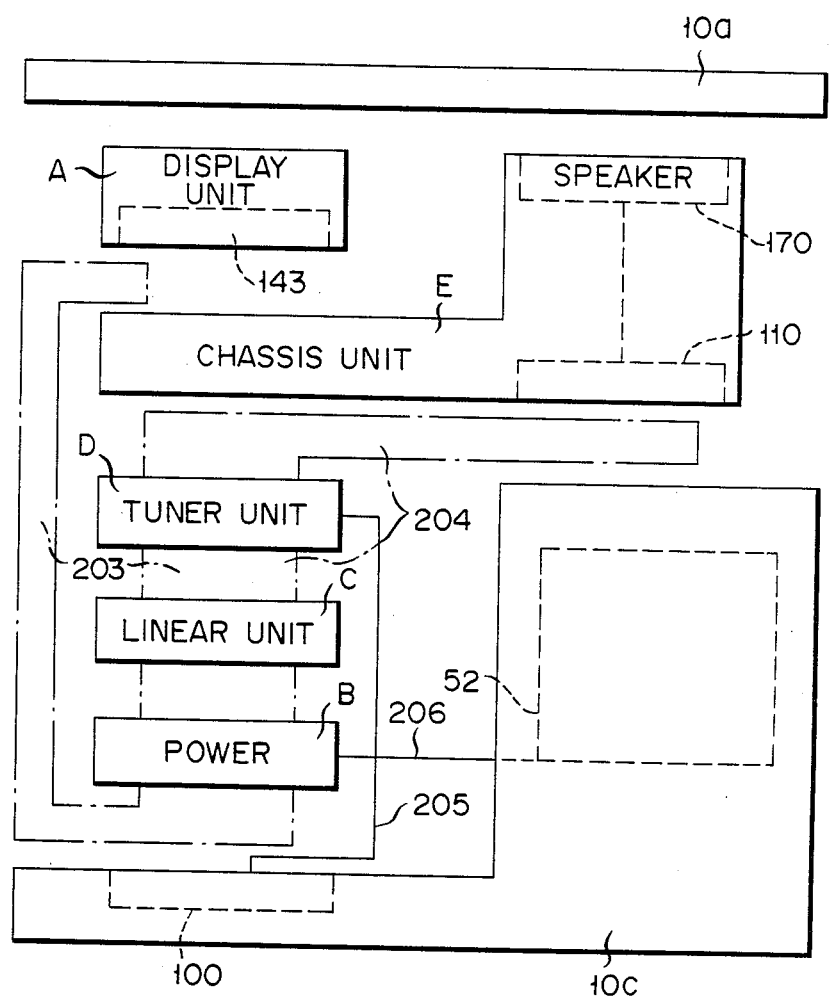
F I G. 27

PORTABLE TELEVISION RECEIVER OF THE PANEL TYPE

BACKGROUND OF THE INVENTION

This invention relates to a panel type portable television receiver using a liquid crystal display panel with a dot matrix array.

Recently, the picture quality of a liquid crystal display device for a picture display of the dot matrix type has been markedly improved. With this improvement, development of the so-called liquid crystal television has approached a practical level.

The liquid crystal display is categorized into two types of display devices. One of the two is a liquid crystal display device using a dot matrix liquid display panel of the twist nematic type, which displays numerals and characters and is mainly used in desk-top calculators, and the like. The other is a liquid crystal display device using a liquid display panel of an active matrix type, in which a silicon substrate containing integrated switching MOS transistors is used as the substrate of the liquid display panel. The liquid crystal display panel of this type is further classified into a DSM type panel and a guest-host type panel.

When comparing the liquid crystal display panels of the twist nematic and active matrix types, the latter is superior to the former in term of the contrast present in a displayed picture. The active matrix type display panel, however, has the following disadvantages. Since the active matrix type display panel uses a silicon substrate, the display device based on such a panel must be limited in size and its manufacturing cost is high. Because of these disadvantages, the dot matrix liquid display panel of the twist nematic type, rather than the active matrix type display device, is suitable for use as the display device of a liquid crystal television receiver. When this dot matrix liquid display panel of the twist nematic type is used, a problem occurs in obtaining an adequate gradation display due to insufficient picture contrast under adverse lighting conditions.

SUMMARY OF THE INVENTION

Accordingly, an object of the present invention is to provide a panel type portable television receiver using a liquid crystal display panel with a dot matrix array and capable of a gradation display by a simple circuit structure.

According to the present invention, a television receiver of the panel type is provided, which comprises: a television tuner means; a circuit means connected to the television tuner means for forming an audio signal, a video signal and a sync signal, by using a signal tuned and output by the television tuner, as well as for properly processing the signals formed, a picture display including about ⅓th as many scanning electrodes as effective T.V. picture scanning lines, and a display panel of the double matrix type in which two picture element electrodes lying on each of the signal electrodes commonly provided in the direction of the width of the scanning electrodes are in opposition to each other, and for displaying an image based on the video signal processed by the circuit means; a display drive circuit means for driving the display panel of the picture display with the duty cycle represented by the following formula wherein $$1 / \left( \frac{C}{A \cdot B} \right)$$

where A is the number of fields constituting one frame, B is the number of horizontal periods for a video signal assigned to a scanning electrode; and C is the number of scanning lines; and a power source means connected to the individual devices to supply voltage thereto.

With such an arrangement, the portable television receiver of the panel type of this invention can provide a satisfactory level of contrast and resolution, even if an electroluminescence illumination panel is used.

BRIEF DESCRIPTION OF THE DRAWINGS

FIGS. 1 and 2 show outer appearances of a television receiver of this invention when a cover of the receiver is closed and opened, respectively;

FIGS. 17 and 18 respectively show an exploded view and a front view of a display unit;

FIGS. 19 and 20 respectively show enlarged cross sectional view taken on lines XIX—XIX and XX—XX of FIG. 18;

FIG. 21 shows an exploded view of a display panel;

FIG. 22 is a functional diagram of the display panel and a display drive LSI;

FIG. 27 shows a functional diagram illustrating an interconnection among the units of the television receiver;

DETAILED DESCRIPTION OF THE PREFERRED EMBODIMENT

A preferred embodiment of the present invention may now be described with reference to the accompanying drawings.

Figure 3:
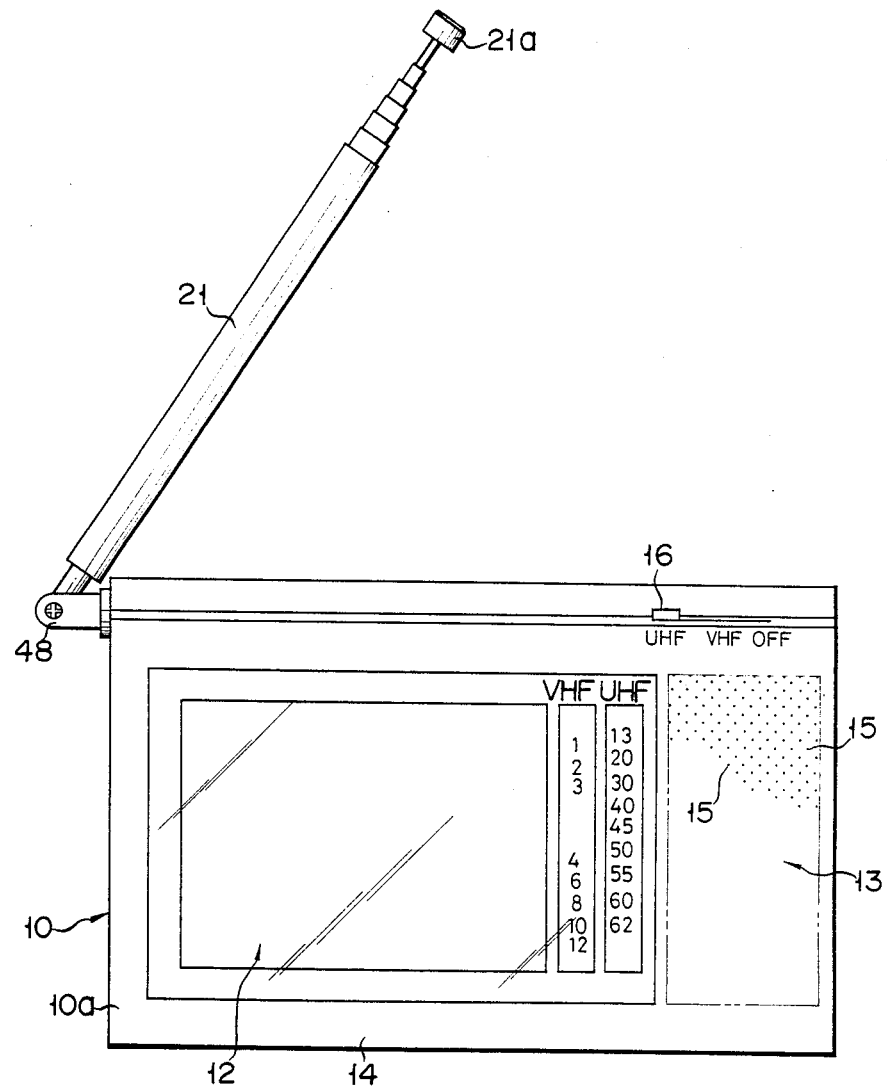
FIG. 3 shows the outer appearance of the television receiver when the cover is removed and a rod antenna is pulled out and raised.
Figure 4:
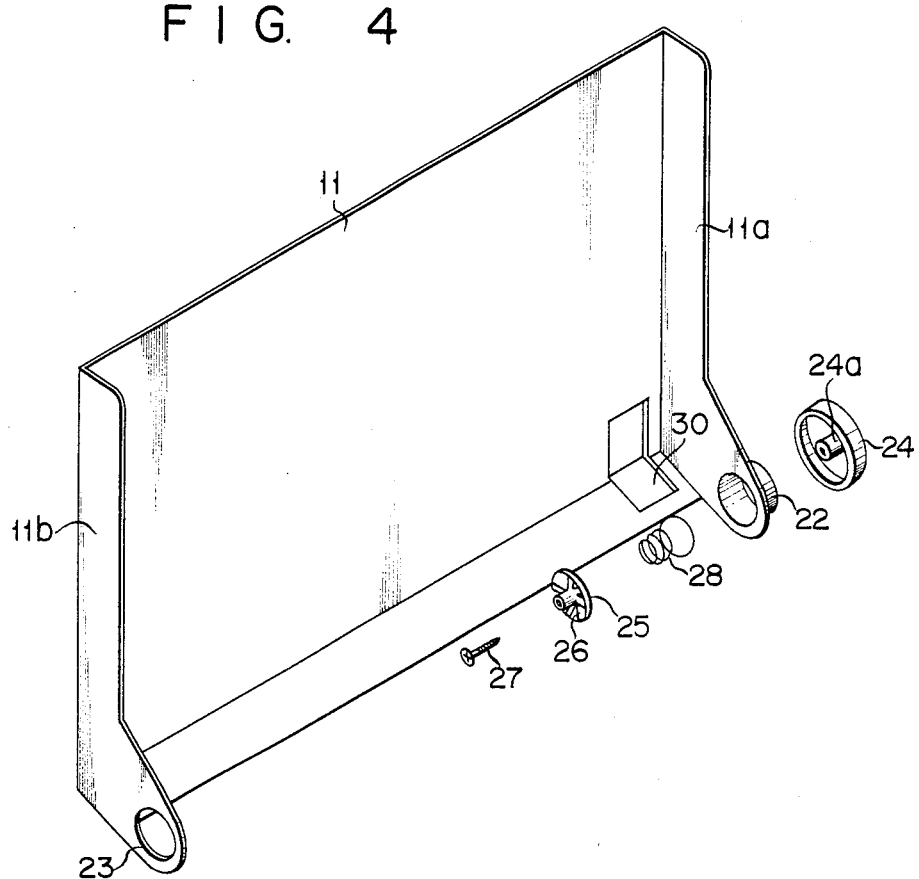
FIGS. 4 and 5 respectively show an exploded view and an enlarged cross section, illustrating a cover mounting structure.
Figure 5:
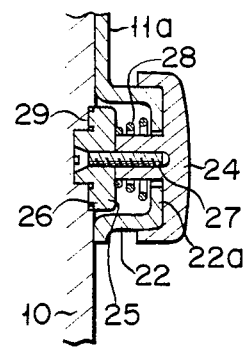

In FIGS. 1 and 2, which illustrate outer appearances of a television receiver according to this invention, a cover 11 is mounted to a receiver case 10, removably and openably. The receiver case 10 is constituted by a front case 10a including a screen 12 and a speaker 13, a middle case 10b and a rear case 10c. The screen 12 has a glass plate 14 and the speaker 13 has a number of holes 15. A knob 16 serving as a power switch and a UHF-VHF select switch is mounted on the upper portion of the rear side wall of the receiver case 10. An external power source connection hole 17, for connection with an external DC power source (a battery box used as an accessory of the television); an external antenna jack hole 18, for connection with an external antenna, e.g., an outdoor antenna; and a hook hole 19 allowing for entry of the hook of a handstrap are provided on the right side wall of the receiver case 10. The handstrap (not shown) has a hook removably hooked to a pin 20 mounted in the hook hole 19. FIG. 3 illustrates the television receiver when the cover 11 is removed and the rod antenna 21 is pulled out and raised. The rod antenna 21, when the television receiver is not used, is completely set within the receiver case 10 except a circular expanded portion or head 21a thereof, as shown in FIGS. 1 and 2. The cover 11, configured as shown in FIG. 4, is removably mounted at one side to the receiver case 10, while swingable about the rear side of the receiver case 10. More specifically, of the side plates 11a, 11b standing upright at the opposite sides of the receiver case 10 in the same direction, side plate 11a has at one end an extended portion with an elliptical tubular portion 22 projecting outwardly therefrom but opening to both sides thereof, on the inside and outside. The other side plate 11b has also at one end an extended portion with a circular hole 23. A circular cap like knob 24 is axially and slidably fitted around the elliptic tubular portion 22, as shown in FIG. 5. The knob 24 has a shaft 24a formed integrally therewith and projecting at the center into the elliptic tubular portion 22. As shown in FIGS. 4 and 5, an elliptic clutch plate 25, which has a stopper teeth equidistantly and radially formed on the surface thereof facing the side wall of the case 10, is movably set in the elliptic tubular portion 22 in the axial direction, when those are assembled. The clutch plate 25 is fixed to the shaft 24a of the knob 24 by means of a setscrew 27. Further, the clutch plate 25 is pressed against the receiver case 10 by means of a coiled spring 28 held compressively between the clutch plate 25 and a flange 22a formed in the inner surface of the outer end of the tubular portion 22. The clutch plate 25 engages with the receiver case 10 in such a manner that the teeth 26, under pressure of the coiled spring 28, closely mesh with stopper grooves 29 which are equidistantly and radially formed on the hood support portion of the outer surface of the receiver case 10. In connection with the other side of the cover 11, the rod antenna 21 is turned down from the position shown in FIG. 3 and antenna head 21a projecting from the case side as shown in FIGS. 1 and 2 is put into the circular hole 23. Under this condition, the cover 11 is pivotally mounted to the receiver case 10. With this structure, for swinging the cover 11 about the bottom part thereof, the knob 24 is pulled outwardly to separate the clutch plate 25 from the side wall of the receiver case 10 and then the knob 24 is turned. For holding the cover 11 at a desired angle, the clutch plate 25 is meshed with the side wall of the receiver case 10. For removing the cover 11 from the receiver case 10, the knob 24 is pulled outwardly to separate the clutch plate 25 from the side wall of the receiver case 10, and one side of the cover 11 is pulled in a direction X, and then the cover 11 is pulled in a direction of Y (as shown in FIG. 2) to remove the circular hole 23 from the antenna head 21a. If the cover 11 is a nuisance to viewing the television, the cover 11 may be easily removed from the receiver case 10. For mounting the cover 11, a reverse procedure is taken. An expanded or embossed portion 30, formed at the left corner of the cover 11, exactly at the portion facing the OFF position of the knob 16, is for receiving the knob 16 mounted on the rear side wall of the receiver case 10 when the knob 16 is set at the OFF position. The provision of the emboss portion 30 is for preventing a failure of power off by the knob 16. If a viewer erroneously closes the cover 11, failing to set the knob 16 to the OFF position, the cover 11 comes into contact with the knob 16 to block the closing of the cover 11.

Figure 6:
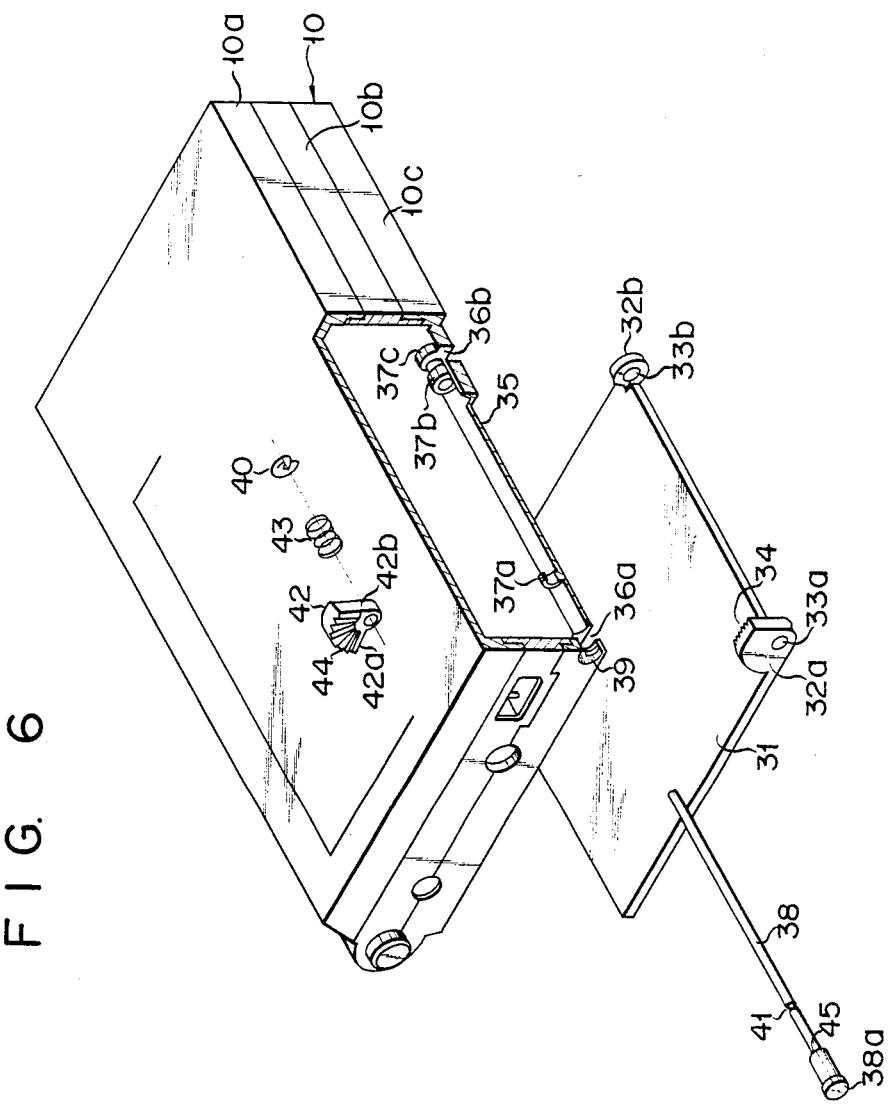
FIGS. 6 and 7 respectively show an exploded view and an enlarged view illustrating a structure for mounting a stand plate.
Figure 7:
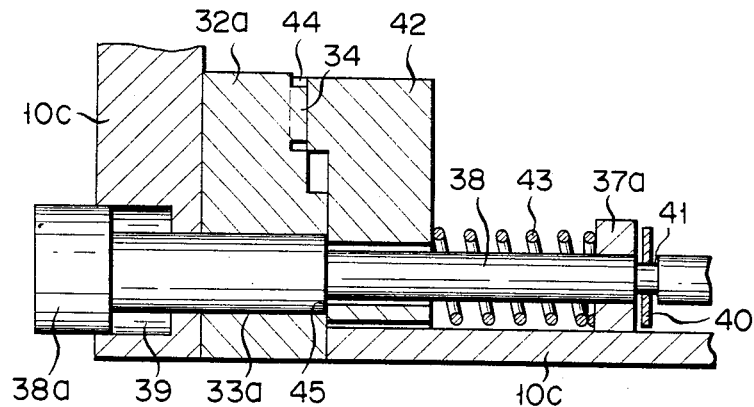

A stand plate 31 is provided on the rear side of the receiver case 10, more exactly the rear side of a rear case 10c, for making it easy to see television when the television receiver is set on a desk or the like. In such use, the stand plate 31 is pulled out and the television receiver is set at an optimum angle to see the television receiver. A structure to mount the stand plate 31 is illustrated in FIGS. 6 and 7. Expanded portions 32a and 32b, having respectively holes 33a and 33b allowing a support shaft 38 to pass therethrough, are provided at both ends of one side of the stand plate 31. Of those expanded portions or sectors 32a and 32b, the portion 32a closer to the side wall of the case is shaped like a fan as viewed from side. The curvature surface of this fan-shaped portion, which is toothed as shown, is denoted by numeral 34. The rear side of the rear case 10c has an elongated depression 35 extending along the rear side of the rear case for receiving the stand plate 31 when it is turned and put back. The back case 10c is provided with openings 36a and 36b into which the expanded portions 32a and 32b are fitted. The holes 36a and 36b are located at both ends of the elongated depression 35. Bearing tubes 37a–37c are formed integral with the rear case 10c. The support shaft 38 to rotatably support the stand plate 31 against the receiver case 10 is inserted into a hole 39 formed in the side wall of the rear case 10c, the bearing 33a of the stand plate 31, the bearings 37a and 37b of the rear case 10c, the bearing 33b of the stand plate 31, and the bearing 37c of the rear case 10c in this order. Reference numeral 40 is an E-ring which is fitted around a groove 41 of the shaft 38 to prevent the shaft 38 from sliping out. The E-ring 40 is received by the bearing 37a on the side wall of the rear case 10c. A fan-shaped clutch plate 42 to face the sector 32a of the stand plate 31 is axially fitted to the shaft 38. The clutch plate 42 is pressed against the sector 32a of the stand plate 31 by means of a coiled spring 43 set compressively between the bearing 37a of the rear case 10c and the sector clutch plate 42. The surface of the clutch plate 42 facing the sector 32a is toothed to provide a radially toothed surface 44. The toothed surface 44 is in mesh with the toothed surface 34 of the sector 32a. The end faces 42a and 42b of the clutch plate 42 are so made as to be in slidable contact with the bottom surface of the rear case 10c and the inner surface of the same, respectively, to prevent the rotation of the clutch plate 42. The groove 41 has a stepped portion 45 in contact with the clutch plate 42. The coiled spring 43 pressing the sector clutch plate 42 urges the E-ring groove 41 so that a button like knob 38a attached to one end of the shaft 38 is set projecting outside the receiver case 10. For raising the stand plate 31 out of the receiver case 10, the button like knob 38a is pushed to move the shaft 38 and push the clutch plate 42 with the stepped portion 45 of the shaft 38, thereby to separate the sector 32a from the clutch plate 42. Then, if the pressure against the button like knob 38a is removed and the clutch plate 42 is urged to mesh with the sector 32a by means of the coiled spring 43, the stand plate 31 is locked in a raised posture. Accordingly, by raising the stand plate 31 at a desired angle with respect to the receiver case 10 and setting it on the desk, the television receiver can be stably supported in a slanted posture. For putting it back into its place in the receiver case 10, the button-like knob 38a is pushed and the stand plate 31 is laid down.

An electronic scheme of the television receiver may now be presented in detail.

A circuit arrangement of the television receiver shown in FIG. 8(a) will first be given. In this television receiver, a circuit board is comprised of an antenna board 100, a knob board 110, a linear circuit board 120, a power source board 130, a display drive control circuit board 140, and a display drive circuit board 150. Circuits to be given later are fabricated on those boards 100–150. The television receiver is further provided with a tuner 160, a speaker 170 and a panel type display device 180, in addition to these boards 100–150. A dot matrix liquid crystal display panel, an electroluminescence display panel or the like may be used for the panel type display device 180. This embodiment uses an electroluminescence EL illumination panel 182 for illumination, which is laminated onto the rear side of the dot matrix liquid crystal display panel 181. The dot matrix liquid crystal display panel 181 used is of the TN (twist nematic) type with a double matrix structure of 120 dots×160 dots, and is operable at 1/65.6 duty cycle. The reason for using this dot matrix liquid crystal display panel 181 will be explained later.

The antenna board 100 is connected to the rod antenna 21 and the external antenna jack mounted to the receiver case 10. Television wave caught by the rod antenna 21 or the external antenna is sent to the tuner 160. The knob board 110 is provided with a tuning knob 111 for selecting a desired television wave, the output signal of which is sent to a circuit fabricated on the linear circuit board 120. The linear circuit board 120 contains a tuner power source circuit 121, a tuning control circuit 122, a filter circuit 123, a linear circuit 124 and a audio amplifier circuit 125. The tuning control circuit 122 responds to the output signal from the tuning knob 111 to apply a tuning signal to the tuner 160. The tuner 160 selects the television wave caught by the rod antenna 21 or the external antenna by the tuning signal from the tuning control circuit 122, and converts it into an intermediate frequency which in turn is sent to the filter circuit 123. The filter circuit 123 allows only the frequency component of a desired channel selected by the tuner 160 to pass therethrough, blocking the frequency components of the adjacent channels. The linear circuit 124 amplifies the intermediate frequency signal output from the filter circuit 123, and detects and separates it into a video signal, an audio signal and a sync signal.

The audio signal output from the linear circuit 124 is amplified by the audio amplifier circuit 125 and is sent to the speaker 170 by which it is sounded. The sync signal output from the linear circuit 124 is sent to a circuit formed in the power source board 130, while the video signal and the sync signal from the same are sent to a circuit formed in the display drive control circuit board 140.

The power source board 130 contains a power source circuit 131 and a panel drive circuit 132, which are formed therein. The power source circuit 131 applies an operation voltage to the tuner power source circuit 121 and a display drive power source circuit 144 to be given later. The panel drive circuit 132, in response to the sync signal from the linear circuit 124, supplies a luminous signal to the electroluminescent (EL) illumination panel 182 over a signal line 145 formed in the display drive control circuit board 140, and supplies a switching signal to a circuit formed in the display drive control circuit board 140. The display drive control circuit board 140 contains an analog to digital (A/D) converter 141, an auto level control circuit 142, a display drive control circuit 143 and a display drive power source circuit 144. The display drive power source circuit 144 is ON and OFF-controlled by a switching signal from the panel drive circuit 132, and its output voltage is applied to the display drive control circuit 143 and a display drive circuit 151 formed in the display drive circuit board 150. The auto level control circuit 142 is detects a level of the video signal from the linear circuit 124, and applies an upper limit reference voltage $V_H$ and a lower limit reference potential $V_L$ to the A/D converter 141. The A/D converter 141, under control of the reference voltages $V_H$ and $V_L$, converts the diode signal from the linear circuit 124 into 4-bit digital data of 16 gray scales and applies it to the display drive control circuit 143. The display drive control circuit 143 synchronizes with the sync signal from the linear circuit 124 to supply a drive signal to the scanning electrodes of the dot matrix liquid crystal display panel 181, and allows 4-bit data from the A/D converter 141 to pass to the display drive circuit 151.

Figure 8B:
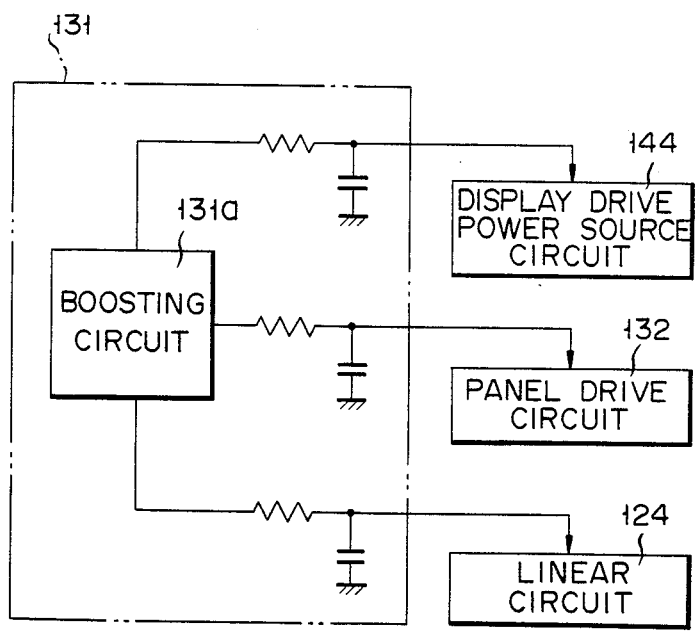
FIGS. 8(a) 8(b) are respectively a block diagram of the subject television receiver and a circuit diagram of a power source circuit used in said television receiver.

The display drive circuit 151 is controlled under the 4-bit data, to apply drive signals to the signal electrodes of the dot matrix liquid crystal display panel 181. The power source circuit 131 is so designed as to supply a voltage to the display drive power source circuit 144 in the display drive control circuit board 140, the panel drive circuit 132 and a linear circuit 124 in the linear circuit board 120, through a boosting circuit 131a for boosting a power source voltage and power supply lines connected to the boosting circuit 131a, as shown in FIG. 8(b). The power supply lines are so arranged as to prevent the supply voltages to the circuits 144, 132, and 124 from varying by an external influence. Further, the same lines are respectively provided with combinations of resistors and capacitors for the purpose of eliminating noise.

The following is an explanation as to why the 120 dots×160 dots, 1/65.6 duty cycle, double matrix display panel of the twist rematic (TN) type is used for the dot matrix liquid crystal display panel 181, and the electroluminescence (EL) illumination panel 182 is laminated on the rear surface of the dot matrix liquid crystal display panel 181.

In the television system now employed in Japan, NTSC, one frame is sent during 1/30 second. The number of scanning lines is 525, and the effective scanning lines of those are approximately 480. Further, the half frame is set for 1/60 second. To reproduce the original scene by the dot matrix liquid crystal display panel, 240 scanning electrodes are required. The aspect ratio of the television screen in the present television system is 3:4. Therefore, the number of dots required is 240×320.

It is almost impossible, however, to realize 240 dots×320 dots for the small liquid crystal display panel used in the pocketable television receiver.

For this reason, 120 dots×160 dots, which is half of the above one, is employed in this type of the television. This number can provide a satisfactory picture quality for the screen size of about 3 inches.

In connection with the scanning drive, if 120 scanning electrodes are driven in a successive manner, time for selecting one electrode is too short to ensure a reliable operation of the liquid crystal. There is an approach to this problem that the 120 scanning electrodes are divided into two groups each of 60 scanning electrodes assigned to the upper and lower halves of the screen, and these halved scanning electrodes groups are driven successively. This approach with the two groups of the scanning electrodes encounters the following difficulty. When both of the electrode groups are driven simultaneously, the signal electrodes are energized by the video signal for half of the screen, and the other half of the screen is also energized to make a display. To avoid this, when the video signal for the upper half of the screen arrives, the drive signals of the scanning electrodes for the lower half of the screen must be stored in a memory. Moreover, when the video signal for the lower half of the screen comes in, the stored scanning electrode signals are is read out to drive the scanning electrodes for the lower half of the screen must be energized. This complicates the circuit construction for the display drive. To cope with this problem, a so-called double matrix system was proposed. In this system, the width of the scanning electrode is chosen over that of two dots. A couple of signal electrodes are disposed in opposition in the direction of the width of each scanning electrodes. This double matrix system needs only 60 scanning lines, half of the 120 scanning lines, and requires a simpler circuit construction for display drive. The display panel based on the double matrix system is operable at 1/65.6 duty cycle.

Illumination from the rear side of the dot matrix liquid crystal display panel 181 by the EL illumination panel 182 is employed to provide a display of the scene on a bright screen and with a good contrast. When the external light is too intensive, the picture presented to viewers is not easy to see, although the EL illumination panel 182 has a high degree of luminance. To ease this problem, the openable cover 11 is used to soften the external light coming onto the television screen.

Figure 8A:
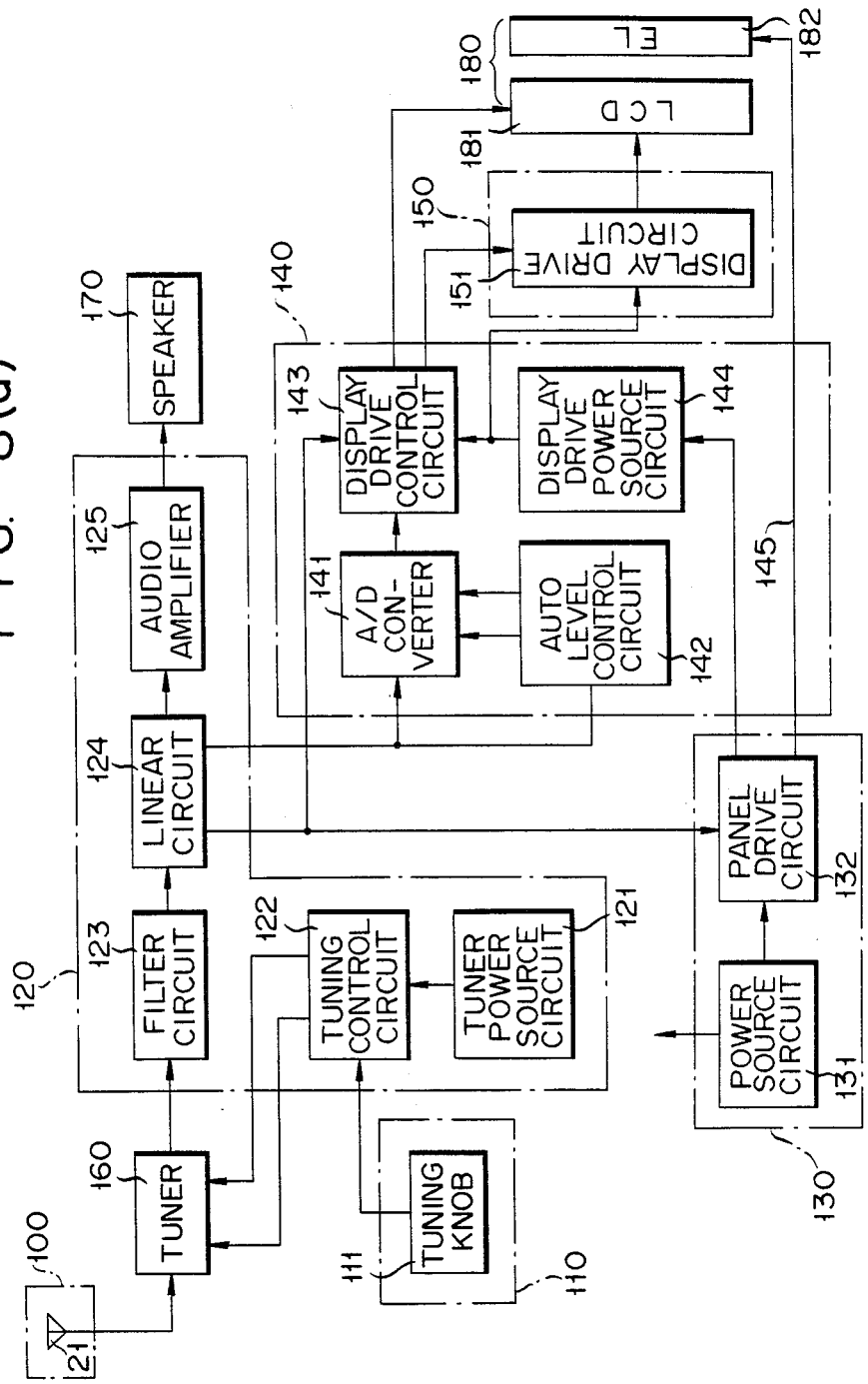
Figure 9:
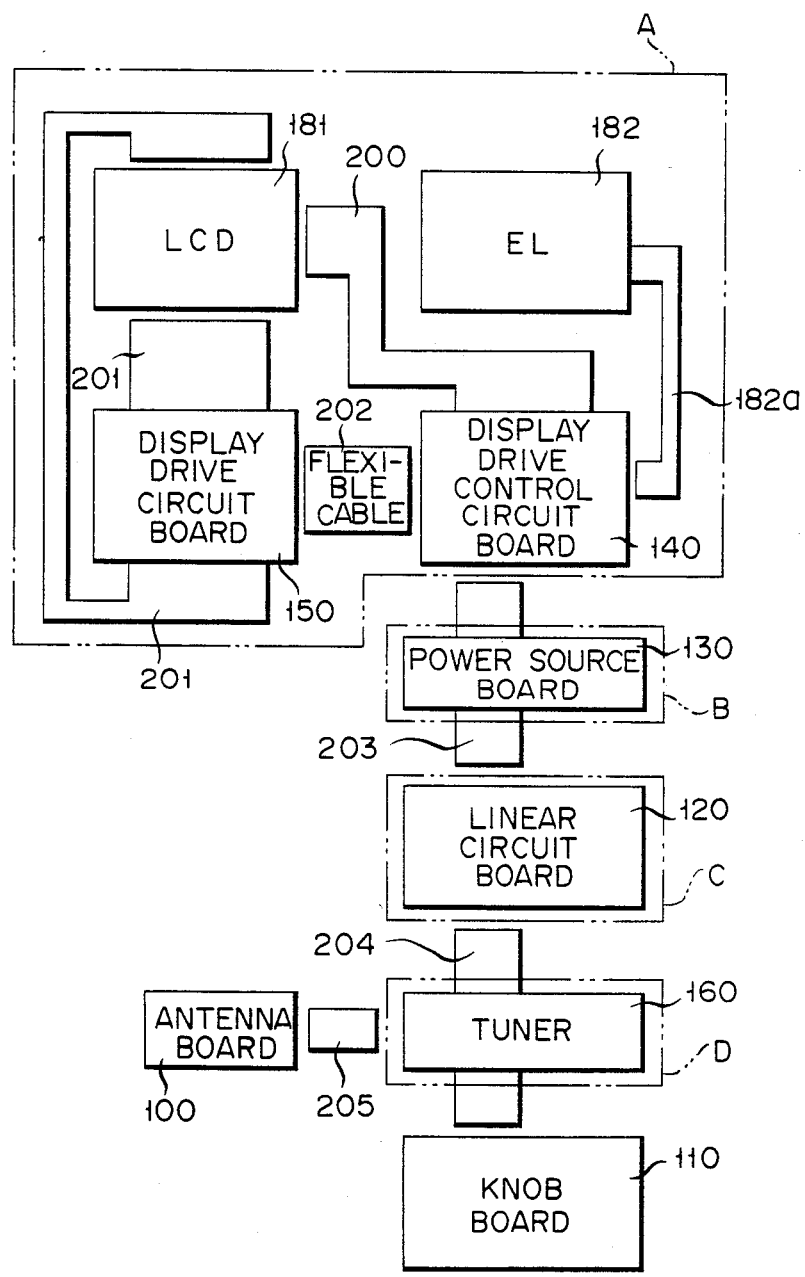
FIG. 9 is a diagram illustrating an interconnection among the boards, a tuner and a picture display device, which are shown in FIG. 8(a)

FIG. 9 shows an interconnection among the boards 100–150, the tuner 160 and the panel type display device 180. The flexible board 200 led from the side of the display drive control circuit board 140 is connected to the terminals of the scanning electrodes of the dot matrix liquid crystal display panel 181 by the thermocompression bonding process. A flexible board 201 led from the display drive circuit board 150 is connected to the terminals of the signal electrodes of the dot matrix liquid crystal display panel 181. A lead wire 182a of the EL illumination panel 182 is soldered to a signal line 145 connecting to the panel drive circuit 132 in the display drive control circuit board 140 (FIG. 8(a)). A flexible cable 202 interconnects the display drive control circuit board 140 and the display drive circuit board 150 by the compression bonding process. The panel type display device 180 (containing the dot matrix liquid crystal dislay panel 181 and the panel type display device 180), the display drive control circuit board 140 and the display drive circuit board 150 are interconnected to form a display unit A. The power source board 130 solely forms a power source circuit unit B. The power source board 130, through a flexible cable 203 soldered thereto, removably but fixedly comes into contact with the display drive control circuit board 140 and is soldered to the linear circuit board 120. The linear circuit board 120 and the tuner 160 constitute a linear unit C and a tuner unit D, respectively. Through a band-like flexible cable 204 containing a plurality of signal lines soldered to the connection part of the tuner 160, the tuner removably but fixedly contacts the knob board 110 and is soldered to the linear circuit board 120.

Figure 10:
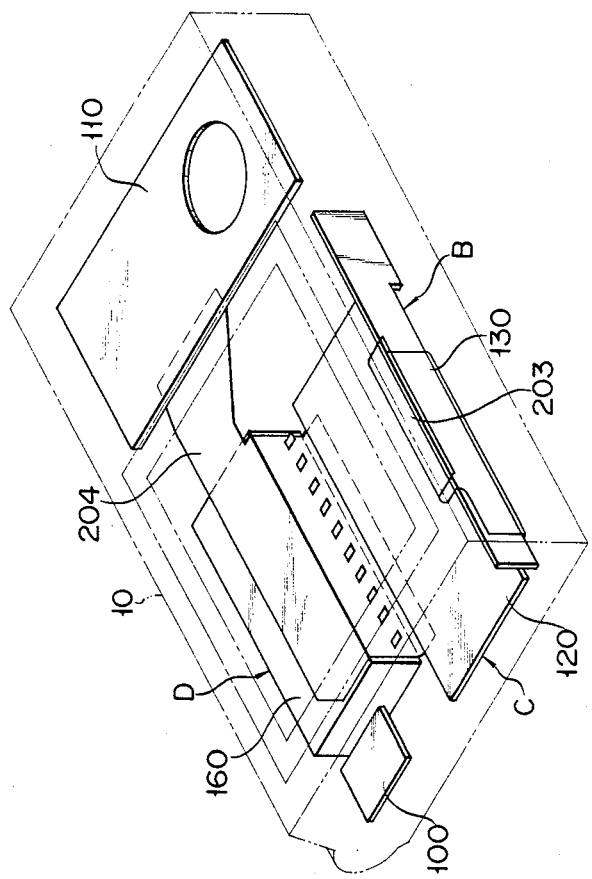
FIG. 10 shows an arrangement of a power source circuit unit, a linear unit, a tuner unit and a knob board, and an antenna board in a receiver case.

The power source unit B of the power source board 130, the linear circuit C of the linear circuit board 120, the knob board 110 and the antenna board 110 are arranged in the receiver case 10, as shown in FIG. 10.

Figure 11:
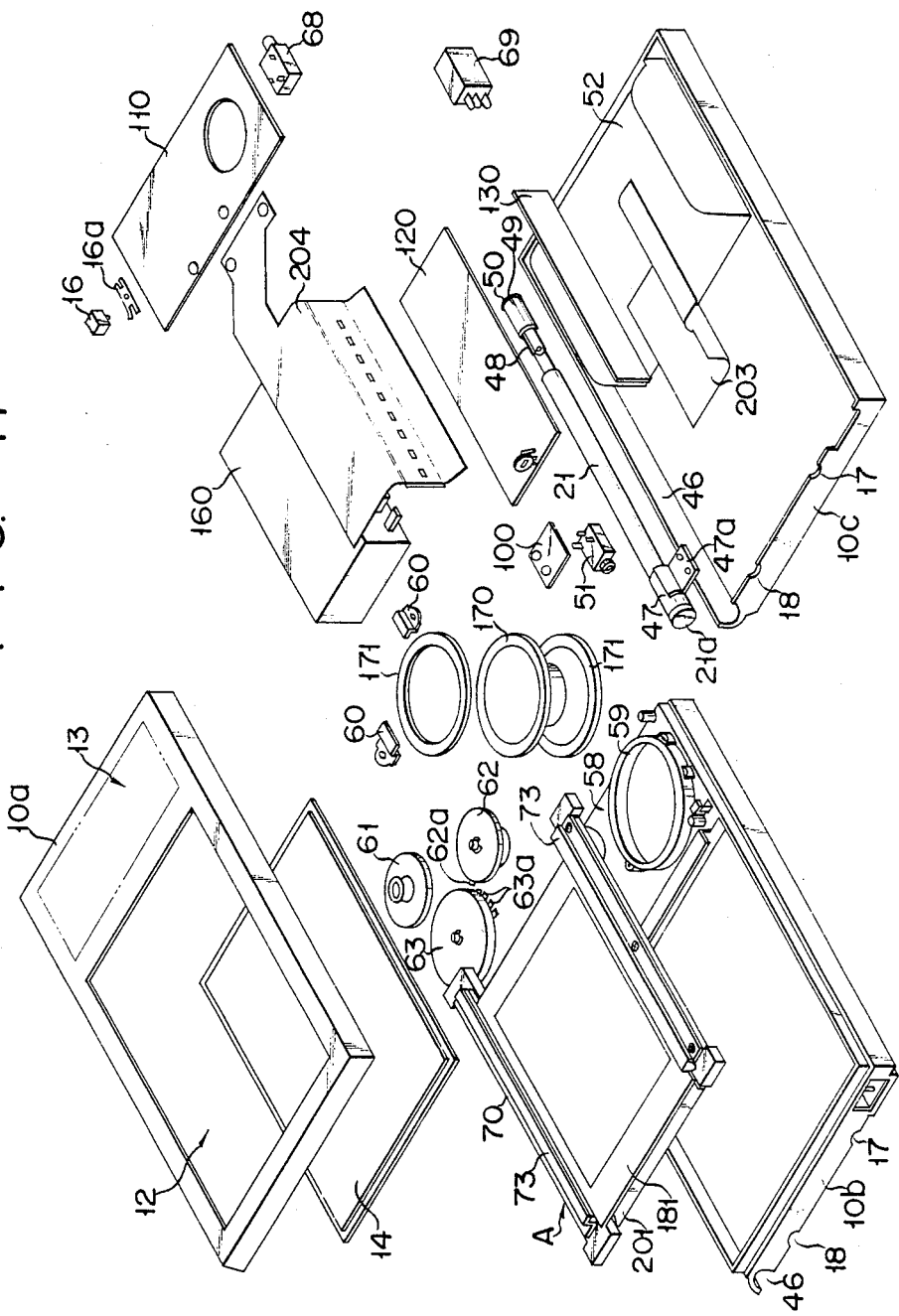
FIGS. 11 and 12 respectively show an exploded view and a cross sectional view of a structure of an overall television receiver, when the television receiver is assembled.
Figure 12:
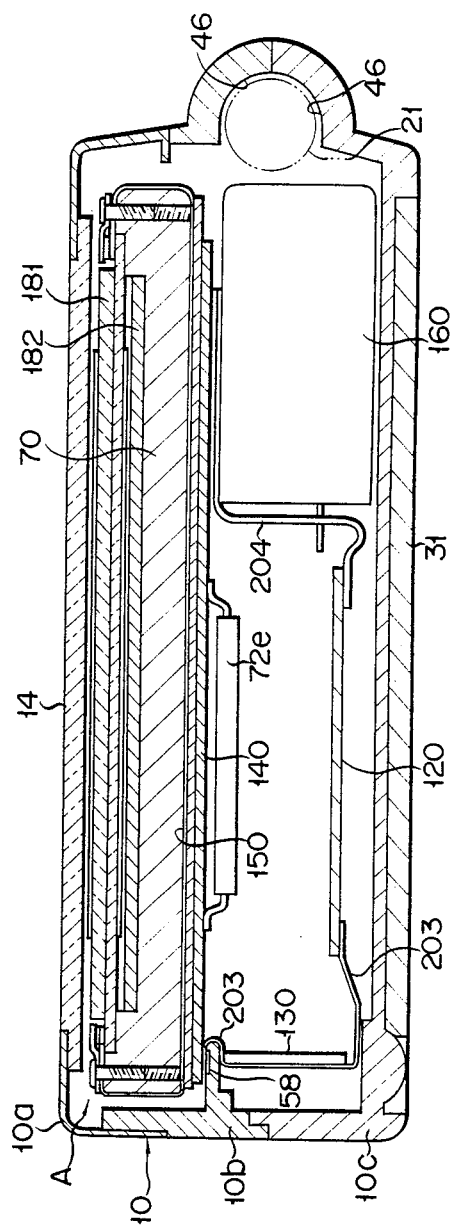
Figure 13:
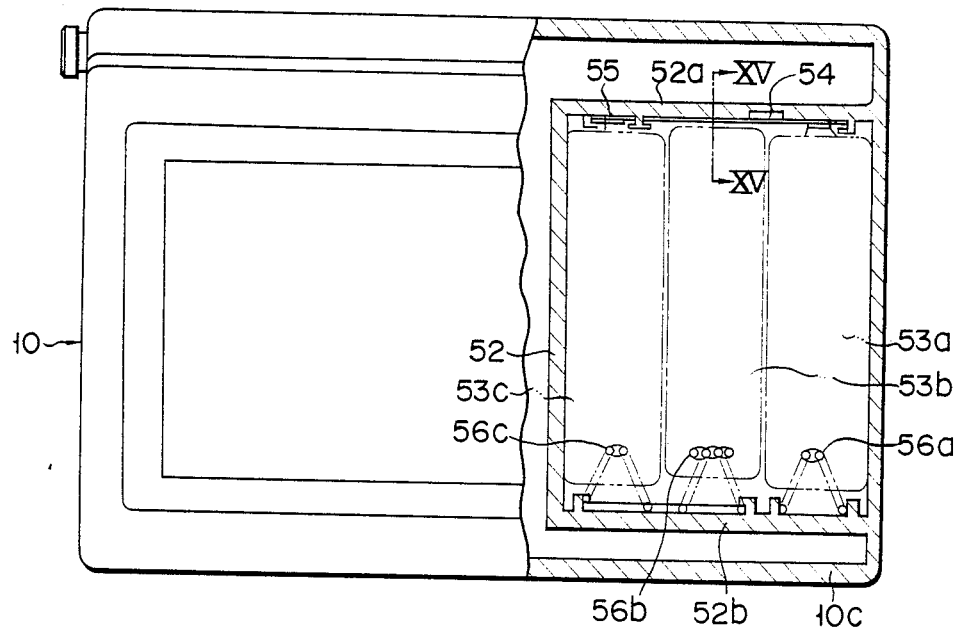
FIGS. 13 and 14 are respectively a partial longitudinal sectional view and a partial cross sectional view illustrating a battery chamber in the receiver case.
Figure 14:
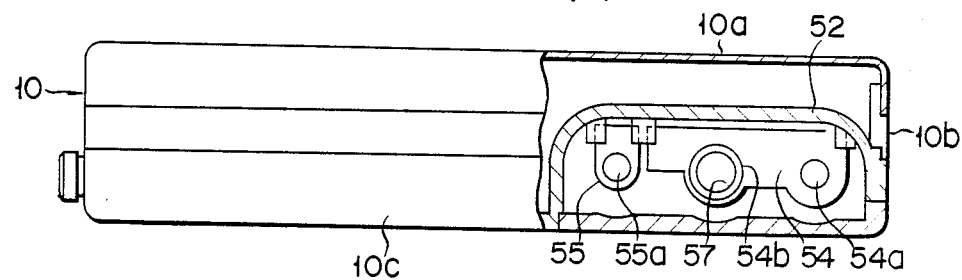
Figure 15:
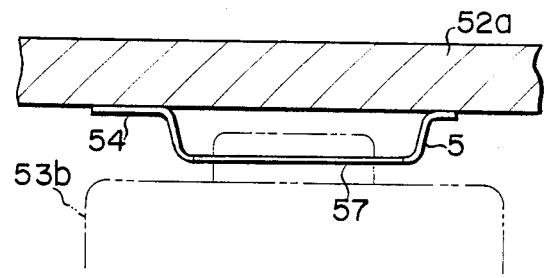
FIG. 15 shows an enlarged cross sectional view taken on line XV—XV in FIG. 13.

The internal structure of the television receiver with the circuit arrangement mentioned above may now be described in detail. In FIGS. 11 and 12, numeral 10a designates the front case, 10b the middle case, 14 the glass plate set to the screen 12, and 21 the rod a antenna. The rod antenna 21 is put in an antenna container cooperatively formed by elongating grooves 46 formed on the surfaces of the rear case 10c and the middle case 10b when the rear case 10c and the middle case 10b are combined. Further, at this time, the rod antenna 21 is slidably retained by an antenna retainer 47 screwed to the inner surface of the antenna pull-out side of the rear case 10c. An antenna terminal tube 49 with a stopper 50 is attached to the base of the rod antenna 21. A hinge 48 is also formed near the base of the rod antenna 21. When the rod antenna 21 is pulled out from the antenna container till the stopper 50 hits the antenna retainer 47. The rod antenna 21 is made to come into electrical contact with the antenna retainer 47. The antenna retainer 47 is electrically connected to an antenna plate 100 which is screwed to the rear case 10c and placed on a terminal plate 47a of the antenna retainer 47. The antenna plate 100 is soldered to an external antenna jack 51 which faces the external antenna jack hole 18 on the side wall of the case. The hinge 48 provided near the antenna base 49, when the rod antenna 21 is fully extended, is present outside of the receiver case 10, as shown in FIG. 3. At this time, the hinge 48 allows one to freely change and set the rod antenna 21 at a desired angle. A battery case 52 formed in the rear case 10c, as well illustrated in FIGS. 13 and 14, is opened to the rear side. The battery case 52 contains three AA batteries 53a–53c arranged in a parallel fasion. Provided on the top wall 52a of the battery base 52 are a contact plate 54 electrically connecting the right and center batteries 53a and 53b by mechanical contact therebetween, and a contact plate 55 contacting only the left battery 53c for electrical connection. The contact plate 55 also serves as a terminal. Provided on the bottom wall 52b of the battery case 52 are contact springs 56a–56c resiliently come into contact with the batteries 53a–53c. The right spring 56a of those springs is also used in a contact terminal while the other two springs 56b and 56c are short-circuited with each other. Contacts 54a–54c protrude from the contact plates 54, 55. Of those three batteries set in the battery case 52, both side batteries 53a, 53c are placed with the plus (+) electrode in contact with contact plates 54 and 55 and the minus (−) electrode in contact with contact springs 56a and 56c. The center battery 56b is so arranged that the plus (+) electrode comes into contact with contact spring 56b and the minus (−) electrode comes into contact with contact plate 54. The battery case 52 is featured in design in that all of the springs 56a–56c are disposed in line on the bottom, by setting the center battery in the battery case 52 in the reverse direction to that of the remaining ones 53a and 53c. With this feature, all of the batteries 53a–53c can be inserted into the battery case 52 in the same directions simultaneously, while pushing and compressing the springs 56a–56c. Generally, the battery is set with the plus (+) electrode for the contact and the minus (−) electrode for the spring. This customary action often leads one to erroneously set the center battery 53b in the same direction as that of the remaining ones. To prevent such an erroneous setting of the center battery, the protruded contact 54b at the center of the terminal contact 54, which is to be in contact with the center battery 53b, is designed to have a depression with a large diameter configured so as to receive the plus (+) electrode of the battery.

In FIG. 11, chassis 58 is integrally formed with respect to the middle case 10b. The knob board 110, the speaker 170 a tuning knob 61 and a volume knob 62 are assembled forming a chassis unit. The speaker 170 sandwiched by buffers 17 is placed in a speaker holder 59 formed on the chassis 58 and fixed by stoppers 60 screwed to the chassis 58.

Figure 16:
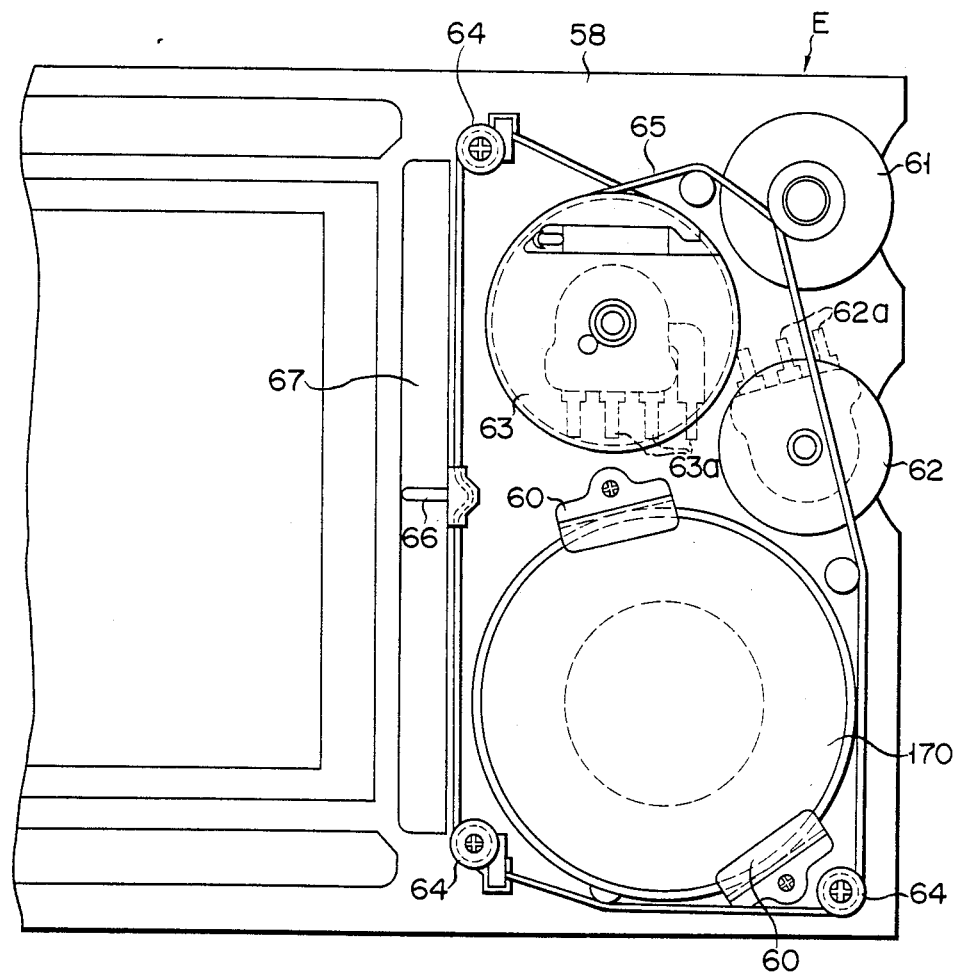
FIG. 16 shows an enlarged view of a part of a chassis unit.
Figure 17:
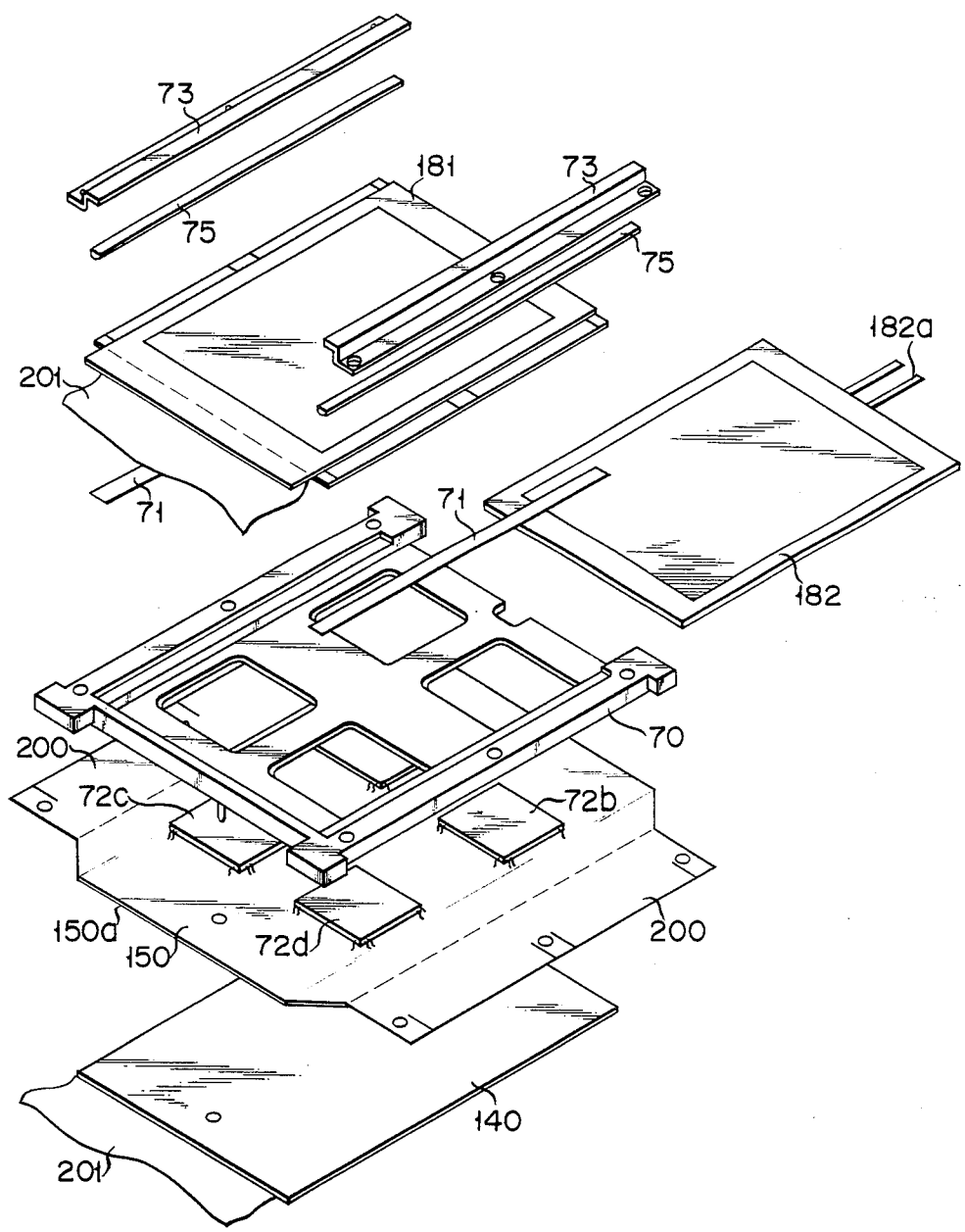
Figure 20:
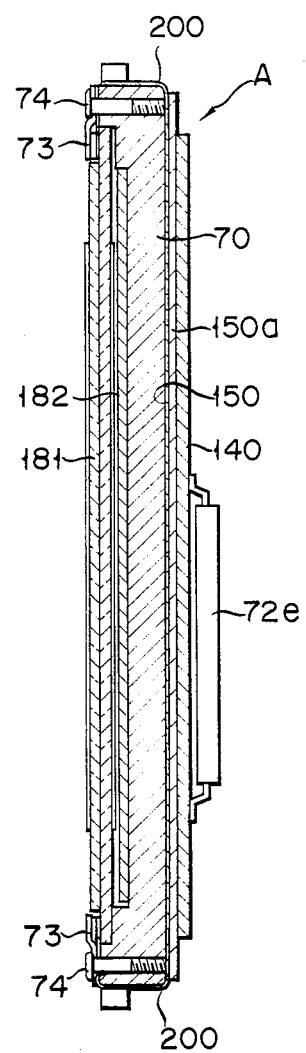

FIG. 16 shows a chassis unit E. In the chassis 58, there is an arrangement of the tuning knob 61, the volume adjusting knob 62, the speaker 170, and pulleys 64. A dial section in the tuning dial 63 is rotated with a belt 65 by turning the tuning knob 61. The belt 65 with a channel pointer 66 is wound around the pulleys 64, as shown. A guide 67 for the channel pointer 66 is integrally formed with respect to the chassis 58. A terminal 62a of the volume adjusting knob 62 and a terminal 63a of the tuning dial 63 are soldered to a knob board 110 (not shown in FIG. 16). A slider 16a of the slide switch serving as a power switches and a VHF-UHF selector is provided in contact with the knob board 110, as shown in FIG. 11, the slider 16a is moved by a knob 16 mounted to the receiver case 10, as shown in FIGS. 2 and 3. In FIG. 11, an earphone jack 68 is soldered to the knob board 110 in opposition to an earphone connection hole (not shown) on the side wall of the receiver case 10 which is opposite to the side wall, with the external antenna jack hole 18 and the line. In FIG. 11, the external power connection jack 69 is provided in opposition to an external power source connection hole 17, and is soldered to the power source board 130. The power source board 130, the linear circuit board 120 and the tuner 160 are arranged on the rear side of the chassis unit, as shown in FIG. 12. The display A is disposed on the rear side of the chassis unit E. In the display unit as shown in FIGS. 17–20, the dot matrix liquid crystal display panel 181 is disposed on the frame 70, and fixed at both sides to the frame 70 by means of a double face tape, the EL illumination panel 182 is sandwiched between the dot matrix liquid crystal display panel 181 and the frame 70. The display drive circuit board 150 with four signal electrode drive LSIs 72a–72d mounted on the obverse side is disposed under the frame 70. The display drive control circuit board 140 with a single scanning electrode LSI 72e on the reverse side is disposed under the display drive circuit board 150. A flexible board 201 thermocompressed at one side to the side of the display drive control circuit board 140 and extended therefrom, it likewise thermocompressed to the scanning electrode terminal of the dot matrix liquid crystal display panel 181. The display drive circuit board 150 is constructed with a flexible film lined with a reinforcing plate 150a. Both sides of the film board are properly extended from the display drive circuit board 150 lined with the reinforcing plate 150a, to provide flexible boards 200. The flexible board 200 is superimposed on the signal electrode terminal of the dot matrix liquid crystal display panel 181 in the direction oriented normal to the flexible board 201 of the display drive control circuit board 140, and connected to the signal electrode terminal with a retainer plate 73 fixed to the frame 70 by means of screws 74. In FIG. 17, reference numeral 75 designates a rubber placed in contact with the flexible board of the retainer plate 73.

The signal electrodes of the dot matrix liquid crystal display panel 181 consists of four blocks. Those blocks are respectively driven for display by the LSIs 72a–72d on the display drive circuit board 150. The reason for this is as follows.

As described above, this embodiment employs the double matrix type display panel for the dot matrix liquid crystal display panel 181. Accordingly, the number of electrodes is 320; and, hence, to drive the signal electrodes of the display panel, the LSI used must have terminals or pins of at least 320+α (which is the number of pins for inputting control signals). Such a large LSI is expensive and has no wide application. Therefore, use of such an LSI is undesirable. In this embodiment, the screen of the dot matrix liquid crystal display panel 181 is quartered into blocks a–d. The signal terminals Y1–Y80, Y81–Y160, Y'1–Y'80 and Y'81–Y'160 of those blocks are respectively connected to the LSI's 72a–72d, for individually driving the ¼ screen blocks. If so, small LSI with 100 pins may be used for the LSIs 72a–72d. The 100-pin LSI is widely applicable and cheap. In this respect, use of such LSI is preferable from an econominal standpoint. The LSI 72e modulated to the display drive control circuit board 140 may be the 100-pin LSI since the number of the scanning electrodes of the dot matrix liquid crystal display panel 181 is 60.

FIG. 22 illustrates an interconnection among the dot matrix liquid crystal display panel 181, the LSIs 72a–72d and the LSI 72e. In this case, the LSI 72e drives the scanning electrode of the dot matrix liquid crystal display panel 181 and applies chip enable signals CE1–CE4 and 4-bit data and timing signals t the LSIs 72a–72e.

Figure 23:
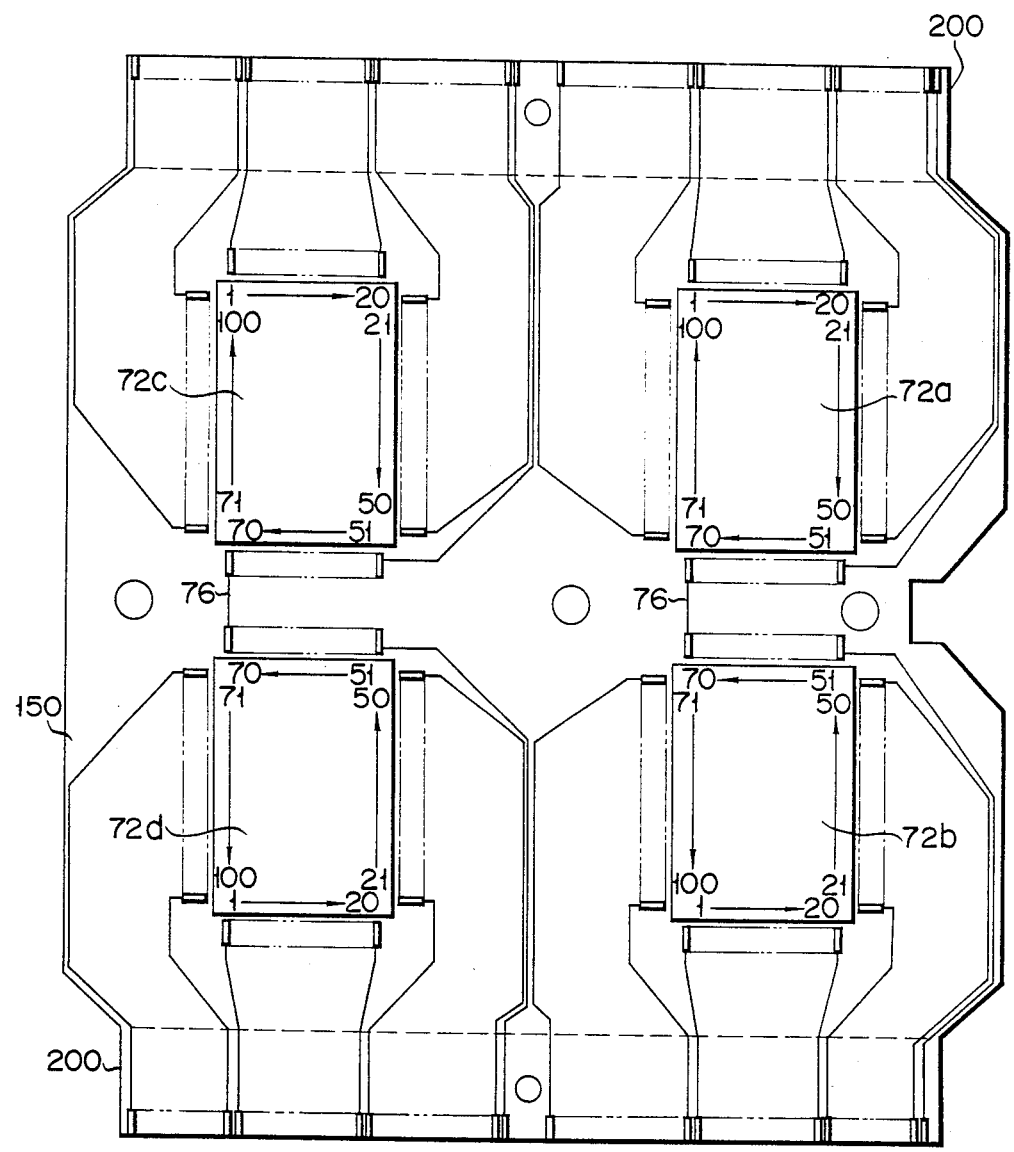
FIG. 23 shows an enlarged view of a display drive circuit board.

If the LSI 72a–72d are disposed on the display drive circuit board 150 in a normal manner, the printed interconnection wires for interconnecting the LSIs on the display drive circuit board 150 and the wires connected to the terminals of the signal electrodes of the dot matrix liquid crystal display panel 181 are entangled, making it difficult to provide optical wiring on the board. Further, the board must be large in size. To avoid such problem, in this embodiment, as shown in FIG. 23, pairs of the LSIs 72a–72i b and 72c–72d are arranged symmetrically with respect to line. Further, LSIs 72b and 72d are mounted on the display drive circuit board 150 after their terminals are subjected to a forward forming, and LSIs 72a and 72c are reversed and mounted to the display drive circuit board 150 after their terminals are subjected to a reverse forming. In the figure, 1 to 20, 21 to 50, 51 to 70, and 71 to 100 designate terminal numbers of LSIs 72a–72d, respectively. With this arrangement of the four LSIs 72a–72d, the terminals 51–70 of those pairs of LSIs 72a–72b and 72c–72d can be connected to each other in the shortest distance by printed wire 76. Therefore, the wiring on the board is simple and the board size is reduced.

Figure 24:
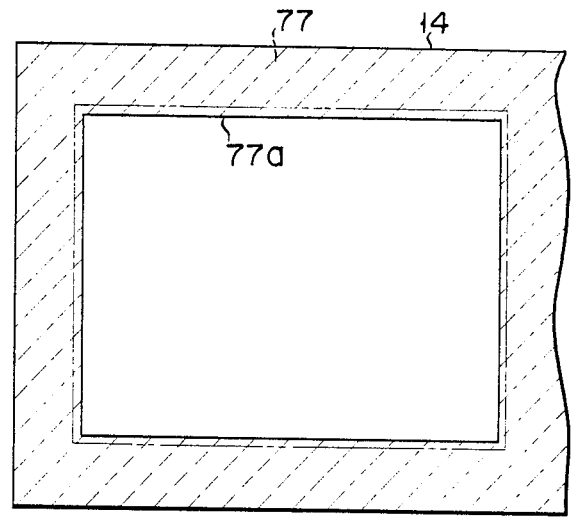
FIGS. 24 and 25 respectively show a front view and a cross sectional view cooperatively illustrating the relationship between a blind frame which is formed on the rear side of a glass plate in a screen, and the display panel.
Figure 25:
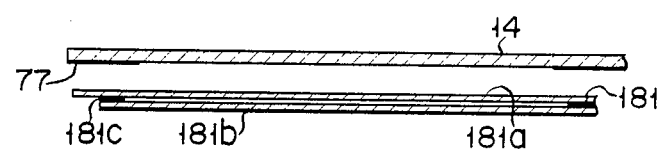
Figure 26:
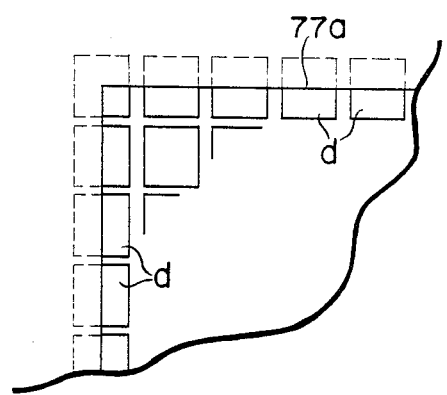
FIG. 26 shows an enlarged view of a part of the illustration in FIG. 24.

A blind frame 77 enclosing the screen, as shown in FIGS. 24–25, is printed on the rear surface of the glass plate 14 mounted to the screen 12 of the front case 10a. The blind frame 77 is so positioned that the inner portion is at substantially the center of the dots (picture elements) on the outermost periphery of the dot matrix liquid crystal display panel 181, as shown in FIG. 26. In FIG. 25, 181a designates an upper electrode board of the dot matrix liquid crystal display panel 181, 181b a lower electrode board, and 181c a sealing member bonding the peripheral edges of the upper electrode board 181a and lower electrode board 181b. In FIG. 24, numeral 181d designates a maximum display area (a liquid crystal filled area enclosed by the sealing member 181c) of the dot matrix liquid crystal display panel 181. The outer portions of the dots on the outermost periphery in the screen are blinded by the blind frame 77, as previously stated. This is done for making sharp the periphery of the screen in view and completely blinding the sealing member 181c of the dot matrix liquid crystal display panel 181 from outside. FIG. 27 shows an electrical interconnection among the units A–E. The electrical connection of those units A–E are performed when the units A–E are assembled into the receiver case 10. For assembling the television receiver, the tuner unit D, the linear unit C and the power unit B are first set to the chassis unit E. A flexible cable 204 previously connected to the power unit B is made to come into contact with the knob board 110 and is fixed thereto by the tuner 160, as shown in FIG. 12. The display unit A is set to the chassis unit E and a flexible cable 203 previously connected to the tuner unit D is set between the display drive control circuit 143 and the chassis 58 of the chassis unit E, as shown in FIG. 12, thereby to connect the flexible cable 203 to the display unit A. The antenna board 100 mounted to the unit D and the rear case 10c, and the power unit B and the rear case 10c are connected by lead wires 205 and 206 in a soldering manner. Then, the front case 10a is screwed to the chassis 58 of the chassis unit E. Further, the rear case 10c is screwed to the chassis 58. The television receiver can easily be assembled by merely connecting the units A–E and setting them in the receiver case 10. Also, the units A–E may individually be assembled, facilitating assembly. The flexible cables 203, 204 connected to the power unit B and the tuner unit D are made to merely come into contact with the chassis unit E and the display unit A, not fixed thereto. Therefore, in maintenance, the chassis unit E and the display unit A may be separated from the tuner unit D and the power unit B. This eases the maintenance of the television receiver. In this case, the tuner unit D and the power unit B; and the power unit B and the rear case 10c are respectively connected by lead wires 205 and 206. With the connection by the lead wires, those are not completely separated, but if the lead wire 205 and lead wire 206 are selected to be sufficiently long, no particular problems arises in the maintenance.

Figure 28:
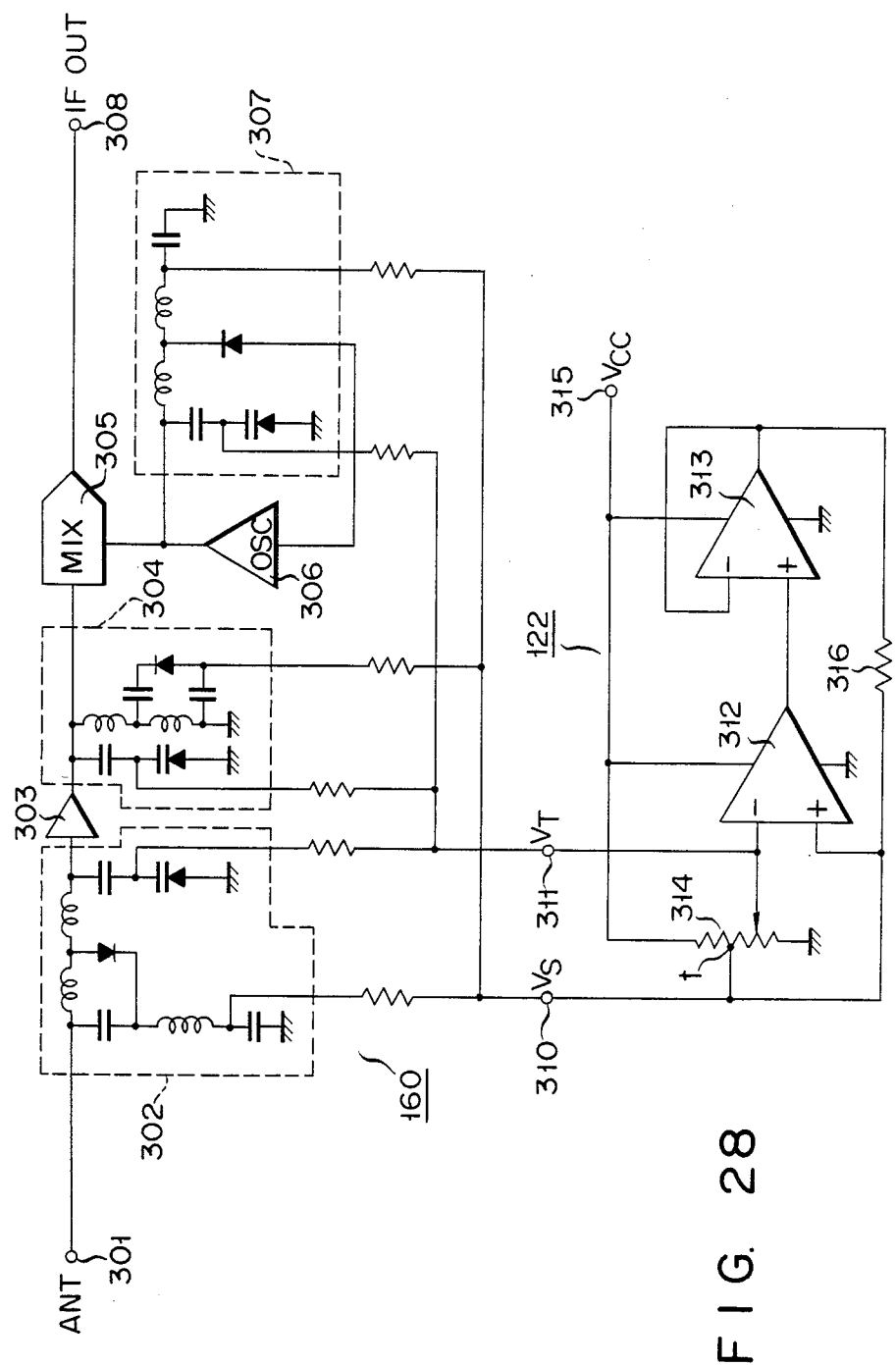
FIG. 28 is a circuit diagram of the tuner and a major portion of a tuner control circuit.

The functional blocks in the television sytem shown in FIG. 8(a) may now be described in greater detail. The practical arrangements of the tuner 160 and the tuning control circuit 122 will first be given, referring to FIG. 28. In the figure, an antenna terminal 301 receives a television wave caught by the antenna (not shown). From the television wave reaching the antenna terminal 301, a desired channel is first selected by an input tuning circuit 302, amplified by a high frequency amplifier 303, further selected by a tuning circuit 304 and sent to a mixer circuit 305. The mixer circuit 305 is supplied with a local oscillating voltage from a local oscillator 306. An oscillation frequency of the local oscillator 306 is varied by a tuning circuit 307 associated therewith. The mixer circuit 305 converts a high frequency television signal selected by the tuning circuits 302, 304 into an intermediate frequency and supplies the intermediate frequency signal to an intermediate frequency amplifier (not shown), through a terminal 308. The tuning circuits 302, 304 and 307, each composed of a variable capacitor, are applied with a channel select voltage Vs from the tuning control circuit 122 via a terminal 310 and a tuning voltage $V_T$ through a terminal 311. The tuning control circuit 122 is composed mainly of comparators 312 and 313 and a variable resistor 314 with a center tap t slidable by the tuning knob 111. The comparators 312 and 313 and the variable resistor 314 are supplied with a DC voltage Vcc of 20 V, for example, via a terminal 314. The output terminal of the comparators 312 and 313 is connected to a plus (+) terminal of the comparator 313 operating as a voltage follower. The output terminal of the comparator 313 is connected to one of the terminal thereof and to a plus (+) terminal of the comparator 312 via a resistor 316, the center tap t of the variable resistor 314, and the output terminal 310 of the channel select voltage Vs. The slider terminal of the variable resistor 314 is connected to one of the terminals of the variable resistor 314 and to a terminal 311 of the tuning voltage $V_T$.

With such an arrangement, the slider terminal of the variable resistor 314 is positioned closer to the group than the center tap t, the potential at the slider terminal being higher than that at the center tap t. Accordingly, the comparator 312 is placed in such a condition that the input voltage at the plus (+) terminal is higher than that at the minus (−) terminal, and its output voltage is in high level. As a result, the output of the comparator 313 is also high in level. The output signal from the comparator 313 is applied as a channel select signal Vs to the terminal 310, and at this time Vs=Vcc−α. The α is determined by the comparator 313, and is much smaller than the voltage Vcc. Accordingly, when the output of the comparator 313 is high in level, the channel select signal Vs is approximately equal to Vcc, 20 V in this example. When the channel select voltage Vs is high, the tuner band of the tuning circuits 302, 304 and 307 are switched to the low channel. At the same time, the channel select voltage Vs is applied to the center tap t of the variable resistor 314. When the slider terminal of the variable resistor 314 is slid from the ground position to the center tap t, the voltage at the slider terminal continuously changes from 0 V to 20 V. The slider terminal voltage is input as the tuning voltage $V_T$ to the terminal 311. Then, the tuning circuits 302, 304, 307 select one of channels 1 to 3 in the low frequency bands, with the sliding operation of the variable resistor 314. When the sliding terminal of the variable resistor 314 passes the center tap t to reach the Vcc voltage supply, $V_s < V_T$, the output level of the variable resistor 312 is inverted. As a result, the output of the comparator 313 is inverted into a low level, and the channel select voltage Vs is "Vs=GND(ground)+α". Since the α is very small as mentioned above, Vs is approximately 0 V, so that the tuner band is switched so as to tune to the high channels of the tuning circuits 302, 304 and 307. At the same time, the potential at the center tap t of the variable resistor 314 falls to 0 V. Hence, when the slider terminal of the variable resistor 314 is moved to the Vcc voltage supply side, the tuning voltage $V_T$ will continuously change from 0 V to 20 V. As a result, the tuning circuits 302, 304 and 307 select one of the 4th to 12th channels at high band, according to the angle through which the slider terminal of the variable resistor 314 is turned. On the other hand, when the slider terminal of the variable resistor 314 is moved from the Vcc voltage supply terminal side toward the other side, Vs becomes higher than $V_T$ as the slider terminal passes the center tap t. In this case, the outputs of the comparators 312 and 313 rise to the high level, whereby the low band is selected.

If the center tap t is positioned closer to the ground side from the center point, a range of the high channel with a larger number of channels may be widened and the tuning is done for both the low and high channels, with the similar sliding amount of the variable resistor 314.

Figure 29:
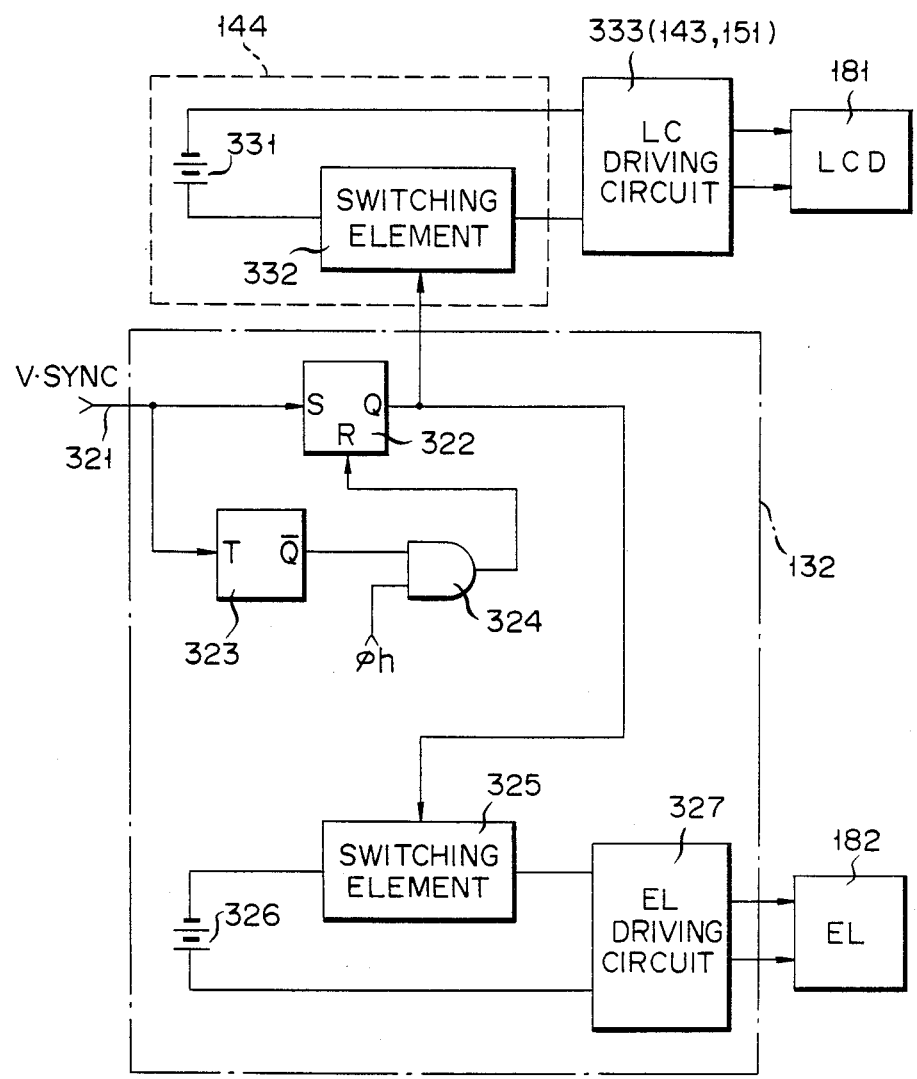
FIG. 29 is a functional diagram of a switching circuit for driving a liquid crystal display panel and an EL illuminating panel, only at the time of tuning.

The panel drive circuit 132 and the liquid crystal drive power circuit 131 may now be described in detail with reference to FIG. 29. In the figure, a signal line 321 provides a path for a vertical sync signal V.SYNC separated from the video signal in the linear circuit 124. The vertical sync signal V.SYNC applied to the signal line 321 is input to the set terminal S of a R-S flip-flop 322 and the trigger terminal T of a retriggerable trigger multivibrator 323. The time duration of the output of the retriggerable trigger multivibrator 323 is sufficiently longer than the period of the vertical sync signal VSYNC. The Q output of the retriggerable trigger multivibrator 323, together with the timing signal timing signal φh, is applied to an AND circuit 324. The output from the AND circuit 324 is applied as a reset signal to the R-S flip-flop 322. The Q output of the R-S flip-flop 322 is applied as an on-off control signal to a switching element 325. The switching element 325 is provided between a DC power source 326 of 100 V, for example, which is formed by boosting the battery voltage, and an EL drive circuit 327, and is used for controlling the power supply to the EL drive circuit 327. The EL drive circit 327 AC-drives the EL illuminating panel 182 in synchronism with the clock pulse when it is supplied with power from the DC power source 326. The Q output of the R-S flip-flop 322 is supplied as an on/off control signal to the liquid crystal display drive power source circuit 144. The liquid crystal display drive power source circuit 144 is connected in series to a switching element 332, which is on/off controlled by the output of the R-S flip-flop 322. The signal line 321 supplies the power to the liquid crystal drive circuit 333, viz., the display drive control circuit 143 and a signal display drive circuit 151, via the switching element 322, to thereby control the drive of the liquid crystal display panel 181.

With the above arrangement, when the tuner 160 is tuned to a desired television wave through the tuning operation of the tuning knob 110, as shown in FIG. 8(a), the linear circuit 124 applies a vertical sync signal V.SYNC to the signal line 321, so that the R-S flip-flop 322 is so set as to have a "1" output and the switching elements 325 and 332 are in an ON state. When the switching element 332 is turned on, the liquid crystal drive DC power source 331 supplies the power to the liquid crystal drive circuit 333 and then the liquid crystal display panel 181 is driven to display. When the switching element 325 is turned on, the DC power source 326 supplies the power to the EL drive circuit 327. The EL drive circuit 327, when supplied with the power of the DC power source 326, AC-drives the EL illuminating panel 182 in synchronism with the clock pulse, causing the panel to emit light. With the illumination of the EL illumination panel 182, a monochromatic picture is reproduced and displayed on the screen. The vertical sync signal V.SYNC applied to the signal line 321 is input to the retriggerable trigger multivibrator 323 to trigger the same. The time duration of the output of the retriggerable trigger multivibrator 323 is sufficiently longer than the period of the vertical sync signal V.SYNC, as previously stated. Accordingly, it is kept in a triggered state when normally supplied with the vertical sync signal V.SYNC. During a triggered state the retriggerable trigger multivibrator 323 is kept at the "0" level at the $\overline{Q}$ output and activates the AND circuit 324. Accordingly, if the AND circuit 324 is supplied with the timing signal φh, the output of the AND circuit 324 is kept at the "0" level and the R-S flip-flop 322 is not reset. As a result, during a period that the vertical sync signal V.SYNC is normally applied to the AND circuit 324, the liquid crystal display panel 181 is energized and the EL illuminating panel 182 is energized to emit light.

In the state wherein the liquid crystal display panel 181 and the EL illuminating panel 182 are driven, if the tuning is done for receiving the television wave of another channel and the supply of the vertical sync signal V.SYNC to the signal line 321 stops, the retriggerable trigger multivibrator 323 is returned to a stable state, and the $\overline{Q}$ output is "1", which output is applied to the AND circuit 324. When the timing signal $\phi$h is applied to the AND circuit 324, the output of the AND circuit 324 is "1" and the R-S flip-flop 322 is reset. Accordingly, the output of the R-S flip-flop 322 is set to "0" to turn off switching elements 332 and 335. Then, the liquid crystal drive circuit 333 and the EL drive circuit 327 stop their drive operation of the liquid crystal display panel 181 and the EL illuminating panel 182.

At the end of the tuning operation to the other television wave, the vertical sync signal V.SYNC is again applied to the signal line 321, so that the liquid crystal drive circuit 333 and EL drive circuit 327 start to drive the liquid crystal display panel 181 and the EL illuminating panel 182. When the liquid crystal display panel 181 and the EL illuminating panel 182 are driven and the television wave is abnormally received, for example, the tuning is done with reference to another channel of the television wave, and the drive of the liquid crystal display panel 181 and the EL illuminating panel 182 are discontinued, to thereby conserve on power consumption. If the liquid crystal drive circuit 333 is driven when no television wave is being received, DC voltage is applied to the liquid crystal display panel 181. Therefore, when the reception of the television wave is not normal, the power supply to the liquid crystal drive circuit 333 is shut off to thereby prevent the DC voltage from being applied to the liquid crystal display panel 181. For this reason, the liquid crystal display panel 181 can be formed to have a thin orientation film, resulting in an improvement of the contrast.

Figure 30:
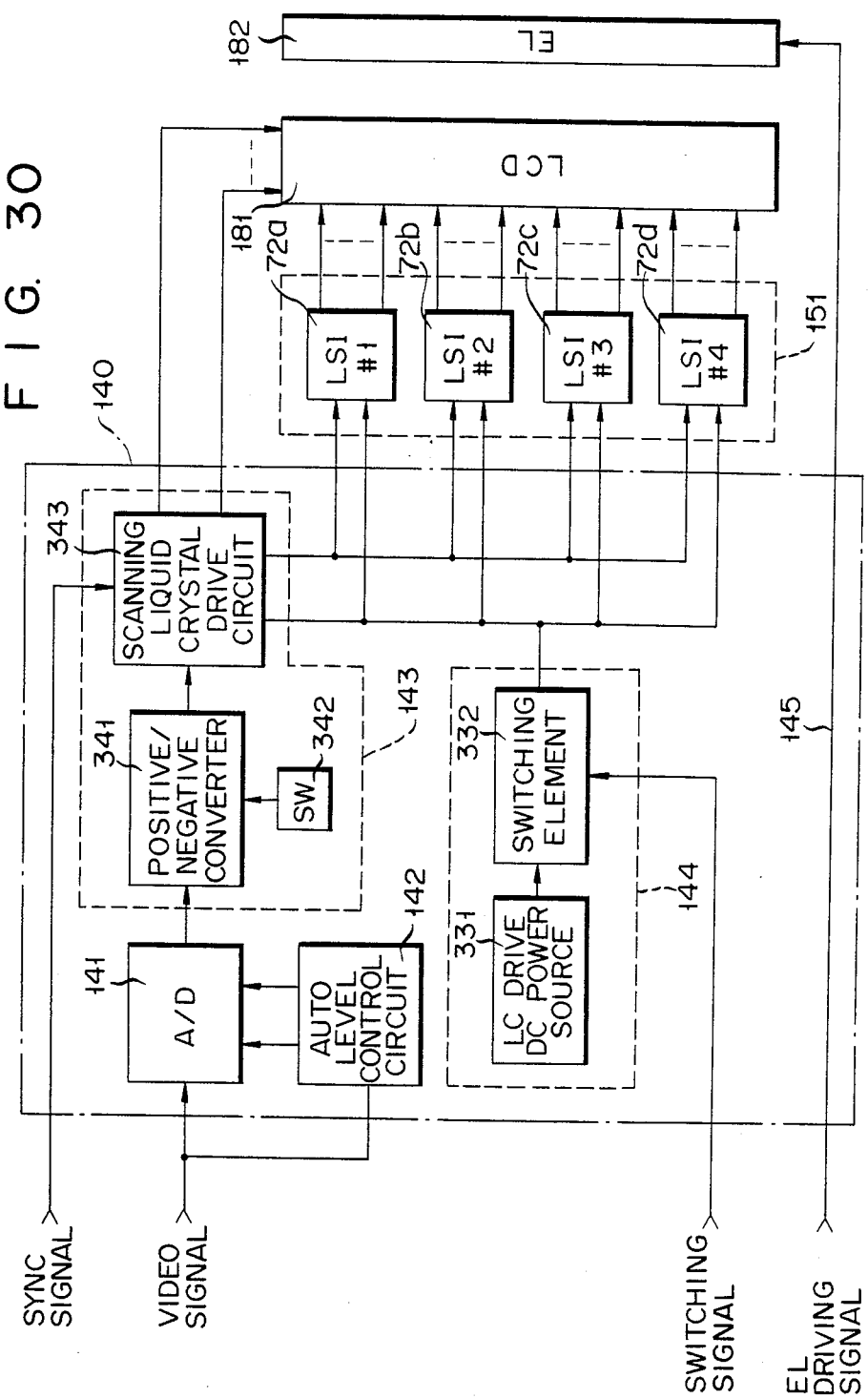
FIG. 30 shows a functional diagram illustrating a display drive control circuit board, a display drive circuit, the liquid display panel and the EL illuminating panel.
Figure 31:
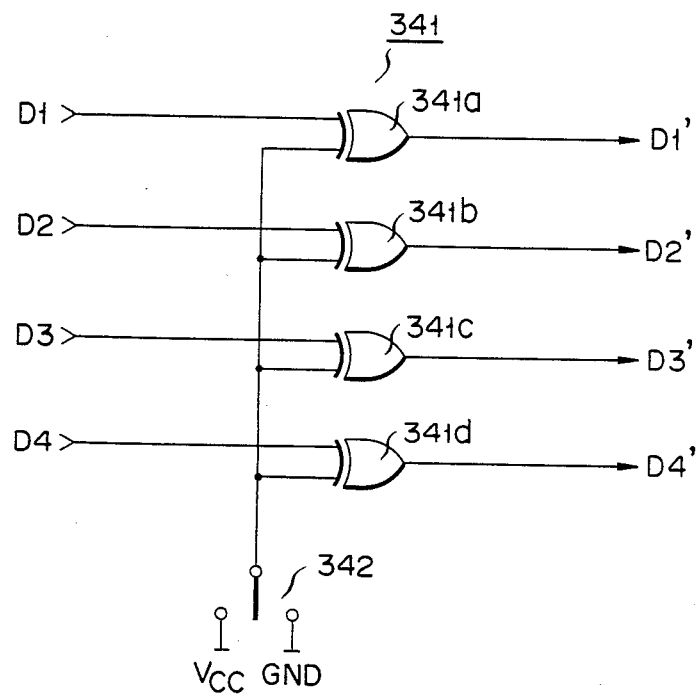
FIG. 31 is a circuit diagram of a positive to negative converting circuit.

FIG. 30 shows a practical arrangement of the display drive control circuit board 140, the signal display drive circit 151, the liquid crystal display panel 181 and the EL illuminating panel 182. The display drive control circuit board 140 contains the A/D converter 141, the auto level control circuit 142, the display drive control circuit 143 and the liquid crystal display drive power source circuit 144, as described above. The liquid crystal display drive power source circuit 144 is composed of the liquid crystal drive DC power source 331 and the switching element 332, as shown in FIG. 29, and is turned on and off by a switching signal from the switching element 332 in the panel drive circuit 132. The liquid crystal drive DC power source 331 supplies the power passing over the switching element 332 to the display drive control circuit 143 and the signal display drive circuit 151. The display drive control circuit 143 is composed of a switch 342 for designating the operation of the positive/negative converter 341, and a scanning liquid crystal drive circuit 343 which operates in response to the output signal from the positive/negative converter 341 and the sync signal from the linear circuit 124. The output of the scanning liquid crystal drive circuit 343 is sent to the liquid crystal display panel 181 and the signal display drive circuit 151. The A/D converter 141 is comprised of exclusive OR circuits 341a–341d, as shown in FIG. 31. The EX OR circuits 341a–341d receive 4-bit outputs D1–D4 of the A/D converter 141 at input terminals, each of which is one of the input terminals of each EX OR circuit, and are supplied at the other input terminals with the DC voltage Vcc or ground potential GND which is selected by the switch 342. When supplied with the ground potential G ("0") selected by the switch 342, the EX OR circuits 341a–341d straightly produces the input data D1–D4 as D1'–D4'. When supplied with the Vcc voltage ("1"), the input data D1–D4 is inverted and produced as D1' and D4'. The positive/negative converter 341 is so designed as to invert the video signal according to the function of the liquid crystal display panel 181. In other words, the liquid crystal display panel 181 has two types, as given by the disposal of a polarizing plate. One is driven by a positive video signal and the other by a negative video signal. With the provision of the positive/negative converter 341, the display drive control circuit board 140 is adaptable for both types of the liquid crystal display panels.

Figure 32:
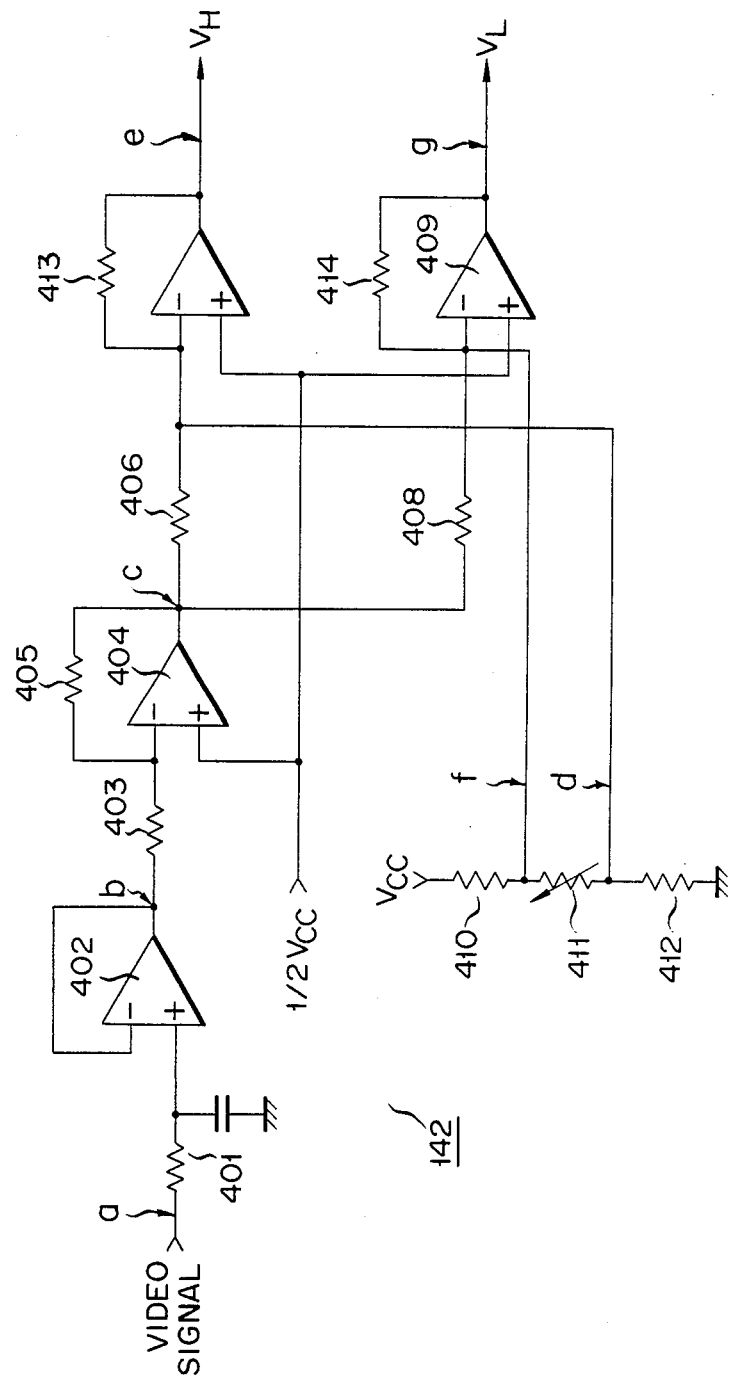
FIG. 32 is a circuit diagram of an auto level control circuit.

The auto level control circuit 142 is practically arranged, as shown in FIG. 32. The video signal from the linear circuit 124 is input to the plus (+) input terminal of an operational amplifier 402, through an integration circuit 401. The operation amplifier 402 is used as a buffer of the voltage follower. The output of the operational amplifier 402 is input to one of the input terminals of the operational amplifier 402 itself and one of the input terminals of the operational amplifier 404 by way of a resistor 403. The output of the operational amplifier 404 is input to one of the input terminals of the amplifier itself through a resistor 405. The operational amplifier 404 is used as a DC inverting amplifier and its output is input, via resistor 406, to one of the input terminals of operational amplifier 407; as well as to one of the input terminals of operational amplifier 409, via resistor 408. Voltage of $\frac{1}{2}$ Vcc is applied to the plus (+) input terminals of operational amplifiers 407 and 409. The Vcc voltage is divided by a series circuit including a resistor 410, a variable resistor 411 for contrast adjustment, and a resistor 412. A divided voltage at the junction between resistors 410 and 411 is applied to the minus (−) input terminal of the operational amplifier 409. A divided voltage appearing at the junction between resistors 411 and 412 is applied to the minus (−) input terminal of the operational amplifier 407. The outputs of the operational amplifiers 407 and 409 are applied to the input terminals of the resistors themselves through resistors 413 and 414, respectively. The output of the operational amplifier 407 is taken out as the reference potential $V_H$ and the output of the operational amplifier 409 is taken out as the reference potential $V_L$.

With such an arrangement, a video signal a transferred from the linear circuit 124 is first integrated by the integration circuit 401 and then amplified by the operational amplifier 402. A signal b output from operational amplifier 402 changes, following the change of the mean value of the video signal a. Signal b is inverted and amplified by operational amplifier 404. Since the reference voltage of operational amplifier 404 is $\frac{1}{2}$ Vcc, output signal c may be given as follows:

$$c = (1/2\ Vcc - b) + 1/2\ Vcc$$
$$= Vcc - b.$$

Output c of operational amplifier 404 is inverted and amplified by operational amplifier 407, and serves as reference potential $V_H$. At this time, the $\frac{1}{2}$ Vcc voltage is applied to the plus (+) terminal of the operational amplifier 407. And the minus (−) terminal is applied with the divided voltage between the resistors 411 and 412. Then, the output e of the operational amplifier 407 is expressed $$e = V_H = (1/2\ Vcc - c) + (1/2\ Vcc - d) + 1/2\ Vcc$$
$$= 3/2\ Vcc - c - d$$
$$= 3/2\ Vcc - (Vcc - b) - d$$
$$= 1/2\ Vcc + b - d$$

The voltage d is set lower than ½ Vcc, for example. The output c of the operational amplifier is subject to the inversion-amplification to be a signal g, i.e., the reference potential $V_L$. At this time, ½ Vcc is applied to the plus (+) terminal of operational amplifier 409, and the divided voltage between the resistor 410 and the variable resistor 411 is applied to the minus (−) terminal. Therefore, the output g of the operational amplifier 409 may be given as:

$$g = V_L = (1/2\ Vcc - c) + (1/2\ Vcc - f) + 1/2\ Vcc$$
$$= 3/2\ Vcc - c - f$$
$$= 3/2\ Vcc - (Vcc - b) - f$$
$$= 1/2\ Vcc + b - f$$

Voltage f is higher than ½ Vcc.

As may be seen from the above equation, the divided voltages d, f change with the adjustment of the variable resistor 411, as do the reference potentials $V_H$, $V_L$. The reference potentials $V_H$, $V_L$ also change according to the output b of the operational amplifier 402, i.e., following the mean value of the video signal. Accordingly, by adjusting the variable resistor 411, the width of each reference potential $V_H$ and $V_L$ to be A/D converted changes with respect to the mean value of the video signal.

Thus, the reference potentials $V_H$ and $V_L$ output from the auto level control circuit 142 are applied to as the reference voltages to the A/D converter 141. The A/D converter 141 fetches the video signal produced from the linear circuit 124, according to the reference potentials $V_H$, $V_L$, and converts it into 4-bit data through a decoder (not shown). Accordingly, the video signal is subjected to A/D conversion according to the values thereof which lie in the vicinity of the mean value. More specifically, when the picture is dark, the mean value of the video signal is low and, thus, the reference potentials $V_H$, $V_L$ are low. On the other hand, when it is bright, the mean value is high and the reference potentials $V_H$ and $V_L$ are high. Thus, the values approximate to the mean value of the video signal are A/D converted. In this case, the width of the reference potentials $V_H$ and $V_L$ changes with respect to the mean value of the video signal by adjusting the variable resistor 411. Accordingly, the A/D converted output taken out from the decoder changes with the width of the reference potentials $V_H$ and $V_L$, and with this, the contrast also changes. The contrast is adjusted by adjusting the variable resistor 411.

In FIG. 30, the signal display drive circuit 151 is composed of four LSIs 72a–72d, as described with reference to FIG. 22, and drives the signal electrodes of the liquid crystal display panel 181.

Figure 33:
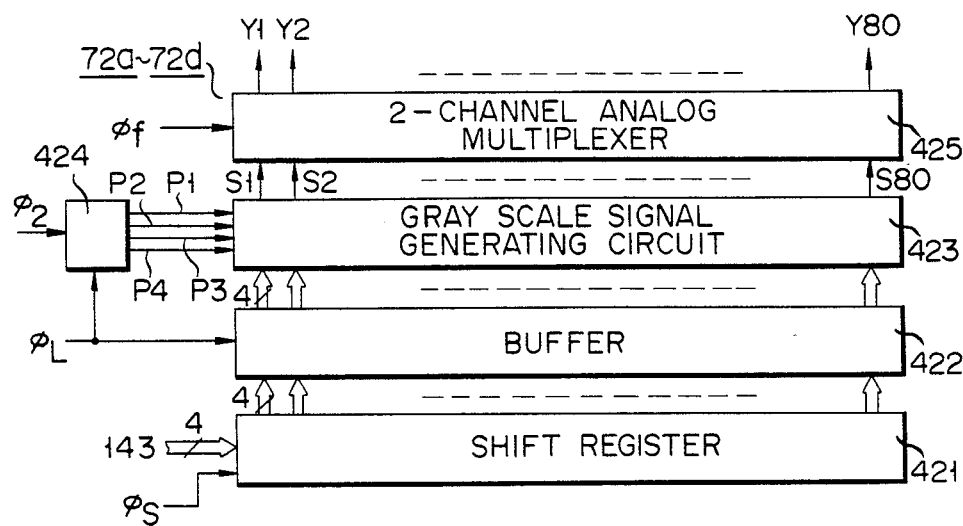
FIG. 33 is a functional diagram of the structure of an LSI in the display drive circuit.
Figure 34:
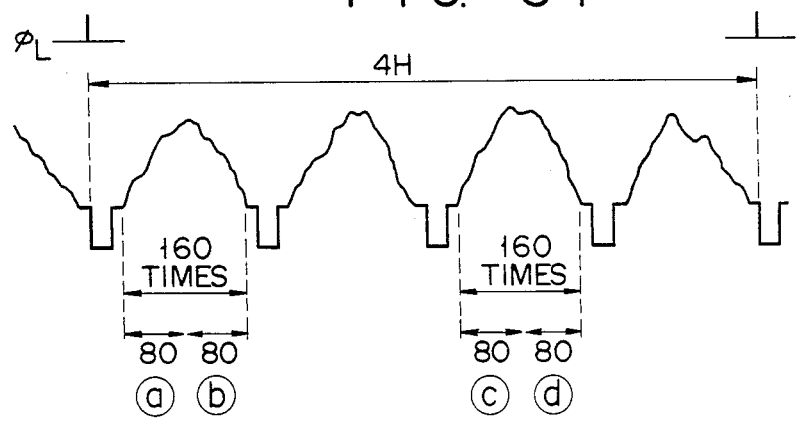
FIG. 34 shows a waveform useful in explaining a sampling operation of a video signal in the display drive circuit.
Figure 35:
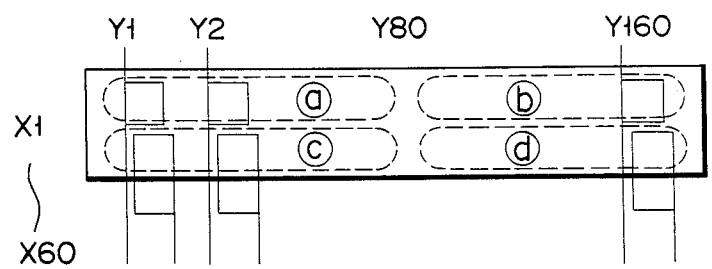
FIG. 35 illustrates positional relationships of LSIs 72a-72d with respect to the drive positions of the liquid crystal display panel.

One of the LSIs 72a–72d forming the signal display drive circuit 151 may be described in typical fashion, with reference to FIG. 33. In the figure, reference numeral 421 designates a shift register of 4bits×80 stages. The shift register 421 fetches the 4-bit video signal coming from the A/D converter shown in FIG. 30, through the scanning liquid crystal drive circuit 343, and shifts it in synchronism with a sampling clock $\phi$s. In this case, LSIs 72–72d are sequentially selected and designated by chip enable signals CH1–CH4 transferred from the scanning liquid crystal drive circuit 343. After the latch pulse $\phi$L at a period of 4H is output, the video signal in the first horizontal period is processed such that the 80-dot data in the first half of the 1 H period is latched in the LSI 72a and the 80-dot data of the second half in the LSI 72b. The video signal in the second horizontal period is discarded. The video signal in the third horizontal priod is processed in such a way that the 80-dots data in the first half of the third period is latched in the LSI 72c and the 80-dot data in the second half in the LSI 72d. The video signal in the fourth horizontal period is also not latched. The data held in the shift register 421 is latched in the buffer 422 of 4 bits×80 stages and transferred to a gray scale signal generating circuit 423. An intensity modulation pulse generating circuit 424 generates intensity modulation signals P1–P4, on the basis of the latch clock signal $\phi$L and the clock pulse $\phi$2, and applies them to the gray scale signal generating circuit 423. The intensity modulation pulse generating circuit 424, comprised of a counter for frequency dividing the clock pulse $\phi$2, is reset by the latch clock $\phi$L and forms the intensity modulation signals P1–P4, by means of the counter, through frequency division of the clock pulse by a factor of two. The gray scale signal generating circuit 423 forms 16 types of gray scale signals S1–S80 with different time widths using the signal from the buffer 420 and the intensity modulation pulses P1–P4 from the intensity modulation pulse generating circuit 424, and applies them to a 2-channel analog multiplexer 425. The 2-channel analog multiplexer 425 generates drive signals Y1–Y80 using a frame pulse $\phi$f and voltages V0, V2, V3 and V5 with different levels. The drive signals Y1–Y80 drive the signal electrodes of the liquid crystal display panel 181. A range of the voltages V0–V5 are divided into 9 levels (more exactly 9.1 levels), with the ground level for V0 and a given potential for V5; level 0 for V0, level 1, for V1, level 2 for V2, level 6 for V3, level 7 for V4, and level 9 for V5. Accordingly, the liquid crystal display panel 181 is driven with a 1/9.1 bias. The liquid crystal display panel 181, as shown in FIG. 35, is driven for display at rows X1–X60 by LSIs 72a–LSI 72d, in such a way that the left upper section (80 dots) of the panel is driven by LSI 72a, the right upper section (80 dots) by LSI 72b, the left lower section by LSI 72c, and the right lower section by LSI 72d. Thus, the liquid crystal display panel 181 has a screen of a matrix of picture elements, consisting of 120 dots (vertical)×160 dots (horizontal). Two fields constitute one frame, as in the conventional televison system, but in both the fields the television beam runs on the same scanning lines. In this display system, the duty cycle may be given as follows:

$$\text{Duty cycle} = 1/\left(\frac{C}{A \cdot B}\right)$$

In the above equation, the letter "A" denotes the number of fields constituting one frame, and is 2. The letter "B" denotes the number of horizontal periods for a video signal assigned to one scanning electrode. In the present invention, 4 H is assigned to one scanning electrode, and therefore B is 4. The letter "C" denotes the number of scanning lines. In the television system of Japan, the number of scanning lines is 525 and the duty cycle is then as follows:

Duty Cycle 1/(525/2·4)

Figure 36:
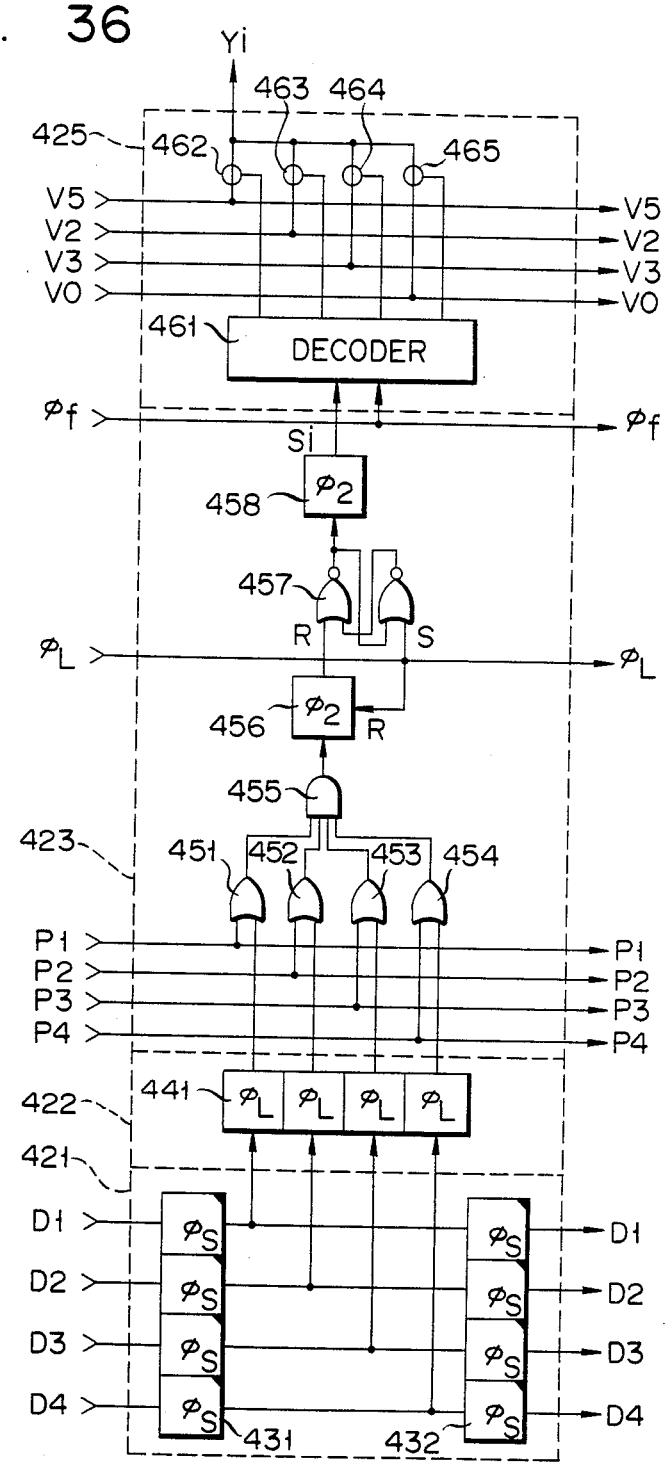
FIG. 36 shows a functional diagram of a major portion in the LSI in FIG. 33.

A practical arrangement of the shift register 421, the buffer 422, the gray scale signal generating circuit 423, and the 2-channel analog multiplexer 425 may now be described with reference to FIG. 36. The arrangement illustrated is merely one of the 80 stages of those circuits, for the sake of simplicity. The shift register 421 is made up of first and second 4-bit registers 431 and 432. The 4-bit data D1-D4 transferred from the scanning liquid crystal drive circuit 343 are loaded into the first register 431. The data stored in the first second register 431 is output to the buffer 422 and to the succeeding stage of the register through the second register 432 responsive to the sampling clock $\phi s$. The buffer 422 is constructed of a buffer register 441 of 4 bits, and fetches the data from the first register 431 in synchronism with the latch pulse $\phi L$ and produces output signals to the gray scale signal generating circuit 423. The gray scale signal generating circuit 423 is composed of OR circuits 451–454, an AND circuit 455 and flip-flops 456–458. The data from the buffer register 441, together with the intensity modulation pulses P1–P4 from the intensity modulation pulse generating circuit 424, is input to an AND circuit 455 via the OR circuits 451–454. The output of the AND circuit 455 is loaded into the flip-flop 456 in synchronism with the clock pulse $\phi 2$. The output of the flip-flop 456 is applied to the reset terminal R of a flip-flop 457. The flip-flop 457 is set by the latch pulse $\phi L$ and reset by the latch pulse $\phi L$. The output of flip-flop 457 is transferred to flip-flop 458, in synchronism with the clock pulse $\phi 2$. Then, it is sent as a gray scale signal Si to a 2-channel analog multiplexer 425. The 2-channel analog multiplexer 425 is composed of a decoder 461 and transfer gates 462–465. The gray scale signal Si from the flip-flop 458 and the frame pulse $\phi f$ are input to the decoder 461. The transfer gates 462–465 are supplied with voltages V5, V2, V3, and V0, respectively, and are gate-controlled by the output from the decoder 461. Under the gate control, any of these voltages V5, V2, V3 and V0 is selected and output as a signal electrode drive signal Yi.

The operation of the circuit shown in FIG. 36 may be described with reference to the timing chart of FIG. 37. The 4-bit data D1–D4 from the A/D converter 141 is applied to the shift register 421 and loaded into the register 431 with the sampling pulse $\phi s$, and is then transferred to the buffer register 441 with the latch pulse $\phi L$. The data stored in the buffer register 441, together with the intensity modulation pulses P1–P4, is input to the AND circuit 445 via the OR circuits 451–454. The intensity modulation pulses P1–P4 are: P4, which is half of $\phi 2$; P3 which is half of P4; P2, which is half of P3; and P1, which is half of P2. When data of "9", "1001" is input to the buffer 420, the OR circuits 451 and 454 at the most and least significant places in the gray scale signal generating circuit 423 are "1" at the outputs, and the outputs of the OR circuits serve as the intensity modulation signals P2, P3. The outputs of the OR circuits 451–454 are produced and applied through the AND circuit 455 to the flip-flop 456, in synchronism with the clock pulse $\phi 2$. In the above example, the logical condition of the AND circuit 455 holds when the intensity modulation pulses P2 and P3 are concurrently at the "1" level. At this time, the AND circuit 455 produces a "1" output, which in turn is loaded into the flip-flop 456. The flip-flop 457 is set at t1 of impression of the latch pulse $\phi L$ and is reset at t2 by the output of the AND circuit 455, when pulses P2 and P3 are both at the "1" level. The output of the flip-flop 457 is applied to the flip-flop 458 in synchronism with the clock pulse $\phi 2$, and the output of the flip-flop 458 is used as the signal Si. As seen from FIG. 37, the duration of "1" of the signal Si is 6/4 H, and the "0" duration 9/4 H. The "1" duration is "6" as a complement of the 4-bit data "9".

Figure 37:
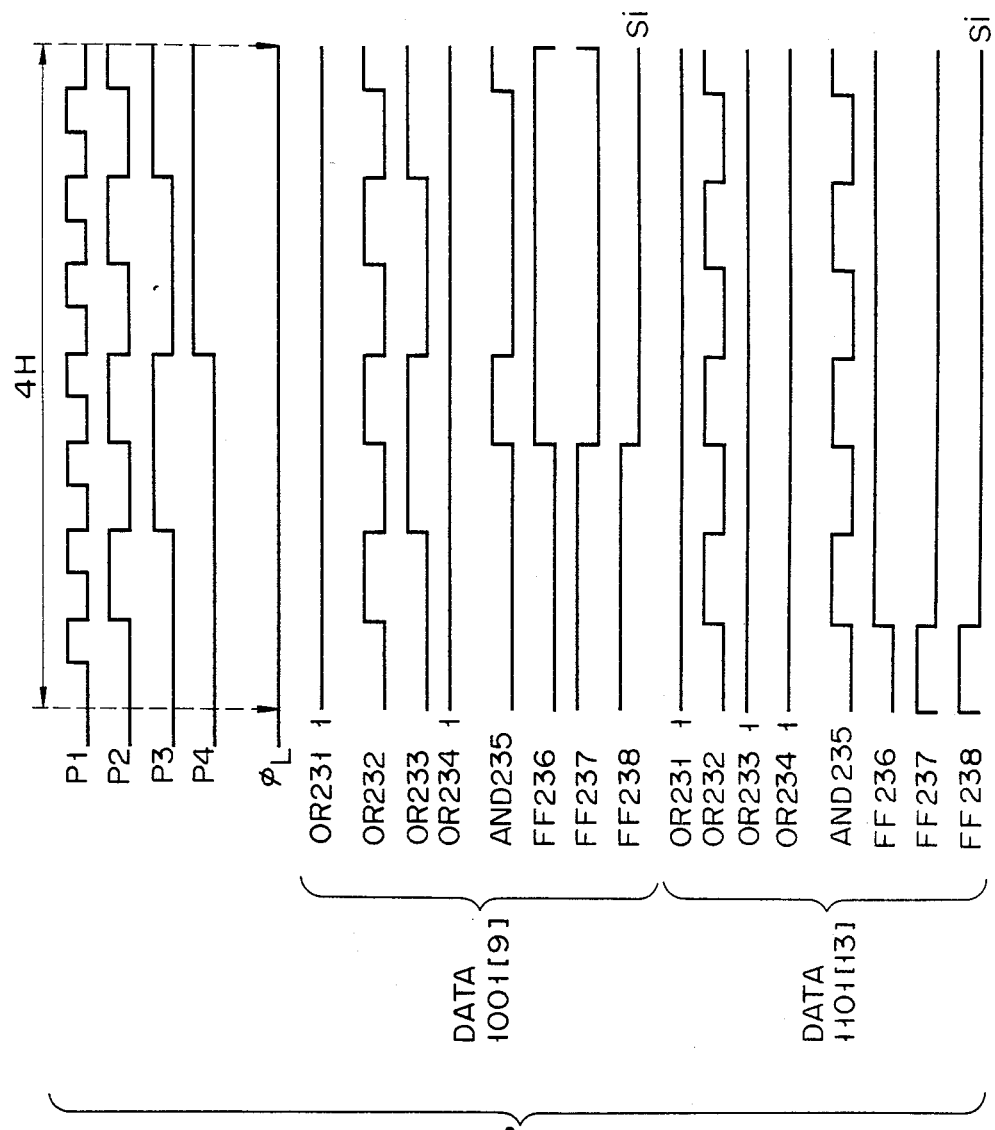
FIG. 37 shows a timing diagram useful in explaining the operation of the circuit of FIG. 36.
Figure 38:
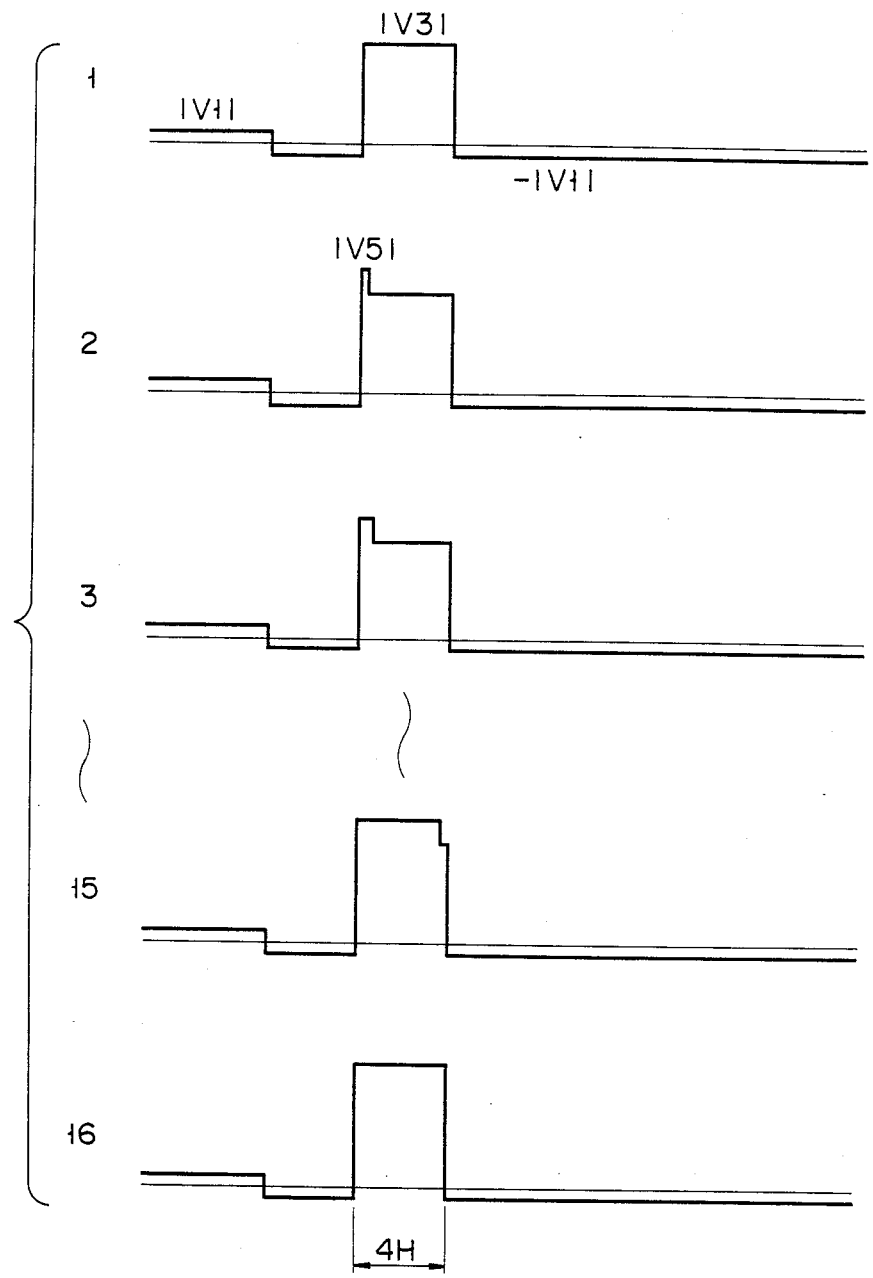
FIG. 38 shows waveforms of 16 gray scale signals formed by a gray scale signal generating circuit.

When the "13" data, for example, is loaded into the buffer 420, the OR circuits 451, 453, 454 produce outputs of "1", as shown in FIG. 37, and the output of OR circuit 452 is used as the intensity modulation signal P2. Accordingly, when the flip-flop 457 is set by the latch pulse $\phi L$, it is then reset by the output of AND circuit 456, at the leading edge of the intensity modulation signal P2. The signal Si from the flip-flop 458 has two types of periods; the "1" period is 2/4 H and the "0" period 13/4. The "1" period is "2" as a complement of "13" of the 4-bit data. Therefore, the gray scale and the 4-bit data are as tabulated below.

TABLE

| D4 | D3 | D2 | D1 | Gray Scale | Shade |
|---|---|---|---|---|---|
| 1 | 1 | 1 | 1 | 1 | Bright |
| 1 | 1 | 1 | 0 | 2 | ↑ |
| 1 | 1 | 0 | 1 | 3 | ↑ |
| 1 | 1 | 0 | 0 | 4 | ↑ |
| 1 | 0 | 1 | 1 | 5 | ↑ |
| 1 | 0 | 1 | 0 | 6 | ↑ |
| 1 | 0 | 0 | 1 | 7 | ↑ |
| 1 | 0 | 0 | 0 | 8 | ↑ |
| 0 | 1 | 1 | 1 | 9 | ↑ |
| 0 | 1 | 1 | 0 | 10 | ↓ |
| 0 | 1 | 0 | 1 | 11 | ↓ |
| 0 | 1 | 0 | 0 | 12 | ↓ |
| 0 | 0 | 1 | 1 | 13 | ↓ |
| 0 | 0 | 1 | 0 | 14 | ↓ |
| 0 | 0 | 0 | 1 | 15 | Dark |
| 0 | 0 | 0 | 0 | 16 | |

FIG. 37 illustrates 16 types of gray scale wave-forms.

The signal Si output from the flip-flop 458, together with the frame pulse $\phi f$ alternately varying between "1" and "0" for every frame, is input to the decoder 461. One voltage is selected from among voltages V0 to V5, by transfer gates 462 to 465, using the outputs of the decoder 461, and is output as the drive signal Yi. For example, V2 is selected when Si="0" and $\phi f$="0"; V2, when Si="0" and $\phi f$="1"; V0, when Si="1" and $\phi f$="0", and V5, when Si="1" and $\phi f$="1". The signal electrode of the liquid crystal display panel 181 is driven by the drive signal Yi.

Figure 39:
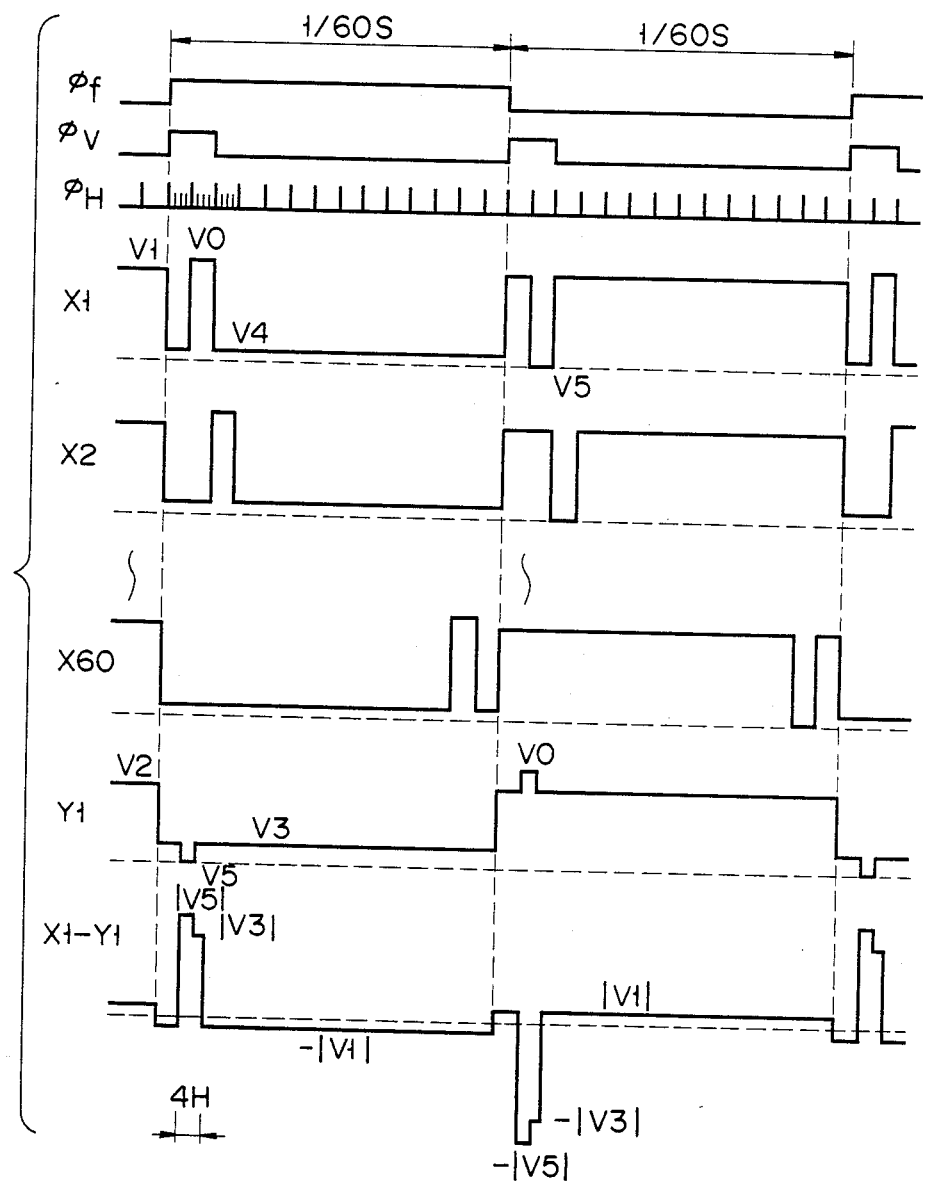
FIG. 39 shows a set of waveforms of drive signals for the liquid display panel.

FIG. 39 shows waveforms of drive signals for the liquid crystal display panel 181. In the figure, X1–X60 are waveforms of scanning electrode drive signals output from the scanning liquid crystal drive circuit 343. The symbol, Y1, denotes a waveform of a signal electrode drive signal output from the LSI 72a of the signal display drive circuit 151. The X1–Y1 equation denotes a waveform when the scanning electrode drive signal and the signal electrode drive signal are superimposed one upon another. The symbol, $\phi f$, denotes a waveform of a frame clock, $\phi v$ denotes a waveform of a vertical sync signal, and $\phi H$ denotes a waveform of a horizontal sync signal.

Figure 40:
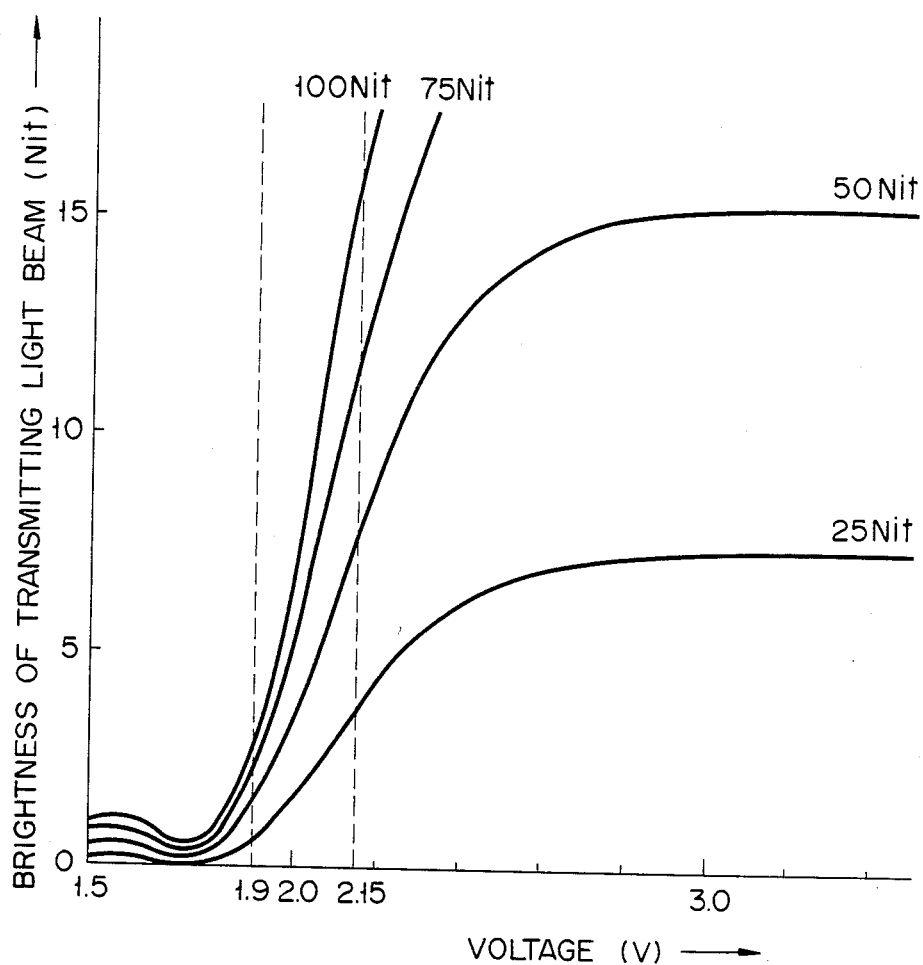
FIG. 40 shows relationships between the intensity of a transmitting light beam and the voltage applied to the liquid crystal display panel for some luminuous intensities on an illumination panel.

The liquid crystal display panel 181 is so designed that the entire display area is uniformly illuminated by the EL illuminating panel 182. The liquid crystal display panel 181 can present a good picture to viewers in a dark, bright or gloomy place. If the voltage applied to the EL illuminating panel 182 is so selected as to illuminate the liquid crystal display panel 181 with sufficient brightness, the picture obtained has good contrast. FIG. 40 graphically illustrates the relationship between the impression voltage and the liquid crystal display panel 181, versus the brightness of transmitted light rays, when the brightness of the EL illuminating panel 182 is set at 25, 50, 75 and 100 Nit. As may be seen from FIG. 40, when the brightness of the EL illuminating panel 182 is set at approximately 75 Nit, the liquid crystal display panel 181 can provide a picture with a high degree of contrast. The conventional reflection type display requires a relatively large amount of incident light to secure a satisfactory contrast on the panel, since the light when traveling is lost at two places. In this embodiment, since the liquid crystal display panel 181 is illuminated from its rear side, the light loss by the liquid crystal display panel 181 is about ½ that of the reflection type display. The luminous brightness of the EL illumination panel 182 is approximately ½ that of the incident light required by the reflection type display. Therefore, the impression voltage applied to the EL illumination panel 182 may be relatively low. The illumination panel, which is of the EL type in the above-mentioned embodiment, may be a panel of the diode type, using light emitting diodes. However, the latter is superior to the former, in that uniform illumination is secured over the entire display area of the liquid crystal panel, less power is consumed and the display constructed is geometrically thinner. The color of the light emitted from the EL illumination panel 182 may be properly selected, since many types of EL illumination panels with different color light emissions are commerically available. In this connection, the color of the light emitted is determined by the luminous material used. Therefore, a monochromatic picture of a desired color can be displayed. The so-called black and white picture is provided by using a white illumination panel, and a black and blue display is obtained by using a blue illumination panel.

1. A panel type portable television receiver using a liquid crystal display panel with a dot matrix array comprising:

A/D converting means for sampling a video signal M times in accordance with a sampling clock within a period of an effective horizontal display and for converting said video signal to N-bit digital data;

(N-bit × M-stage shift register means for sequentially shifting said N-bit digital data converted by said A/D converting means in synchronism with said sampling clock used as a shift clock;

(N-bit × M-stage buffer circuit means for latching data stored in said shift register by a latch pulse having a cycle of an integral multiple of a horizontal scanning cycle;

intensity modulation pulse generating circuit means for generating N kinds of intensity modulation pulses;

M-stage logic circuit means to which are applied said N kinds of intensity modulation pulses from said pulse generating circuit and said N-bit digital data from said buffer circuit, said logic circuit means producing gradation signals having $2^N$ kinds of pulse widths corresponding to said digital data;

voltage selecting circuit means for decoding said gradation signals from said logic circuit and for producing an output signal tht varies with said gradation signals;

scanning signal generating circuit means for sequentially outputting a scanning signal in synchronism with said latch pulse; and dot matrix liquid crystal display panel means of the twist nematic type which is driven by supplying a signal electrode with an output signal from said voltge selecting circuit and supplying a scanning electrode with said scanning signal from said scanning signal generating circuit.

2. The panel type portable television receiver of claim 1 wherein said intensity modulation pulse generating circuit means generates N-kinds of intensity modulation pulses obtained by dividing reference clocks into $1/1, \frac{1}{2}, \ldots (\frac{1}{2})^{N-1}$.

3. The panel type portable television receiver of claim 1 wherein said M-stage logic circuit means includes N OR gates to each of which is applied one of the N kinds of intensity modulation pulses from the intensity modulation pulse generating circuit means and one bit of the N-bit digital data from said buffer circuit means, an AND gate to which is applied outputs from said N OR gates, and a latch circuit for producing said gradation signal.

* * * * *